US010805068B1

(12) United States Patent
Leise et al.

(10) Patent No.: US 10,805,068 B1
(45) Date of Patent: Oct. 13, 2020

(54) SYSTEMS AND METHODS FOR FEATURE-BASED RATING VIA BLOCKCHAIN

(71) Applicant: STATE FARM MUTUAL AUTOMOBILE INSURANCE COMPANY, Bloomington, IL (US)

(72) Inventors: William J. Leise, Normal, IL (US); Douglas A. Graff, Mountain View, MO (US); Stacie A. McCullough, Bloomington, IL (US); Shawn M. Call, Bloomington, IL (US); Eric Bellas, Bloomington, IL (US); Jaime Skaggs, Chenoa, IL (US); Jacob J. Alt, Downs, IL (US); Eric R. Moore, Heyworth, IL (US); Vicki King, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 168 days.

(21) Appl. No.: 15/899,799

(22) Filed: Feb. 20, 2018

Related U.S. Application Data

(60) Provisional application No. 62/542,496, filed on Aug. 8, 2017, provisional application No. 62/542,477, filed
(Continued)

(51) Int. Cl.
*H04L 29/06* (2006.01)
*H04L 9/06* (2006.01)
(Continued)

(52) U.S. Cl.
CPC .......... *H04L 9/0637* (2013.01); *G06F 21/602* (2013.01); *G06Q 30/018* (2013.01);
(Continued)

(58) Field of Classification Search
CPC ............................ H04L 9/0637; G06F 21/602
(Continued)

(56) References Cited

U.S. PATENT DOCUMENTS

| 6,211,777 B1 | 4/2001 | Greenwood et al. |
| 7,502,772 B2 | 3/2009 | Kidd et al. |

(Continued)

FOREIGN PATENT DOCUMENTS

WO     2017/189361 A1     11/2017

OTHER PUBLICATIONS

Blockchain in the insurance sector. Retrieved from the internet at: <URL: https://www.pwc.co.uk (2016).
(Continued)

*Primary Examiner* — Longbit Chai
(74) *Attorney, Agent, or Firm* — Marshall, Gerstein & Borun LLP

(57) ABSTRACT

The present embodiments relate to systems and methods for using a blockchain to record information related to the lifecycle of a vehicle associated with a Vehicle Identification Number (VIN). For example, the VIN lifecycle process may be used to develop safety-feature based insurance models. The systems and methods may include calculating a safety rating for a safety feature based upon data accessed at a blockchain. The safety rating may be used to generate a product associated with a new vehicle type, such as an insurance product covering the new vehicle type. The systems and methods described herein may allow for using a blockchain which gives the option for private information, and permissioned participants in the blockchain. In particular, the systems and methods may allow for a distributed consensus amongst businesses, consumers, and authorities, as to the validity of information and transactions stored on the blockchain.

20 Claims, 20 Drawing Sheets

Related U.S. Application Data on Aug. 8, 2017, provisional application No. 62/542,456, filed on Aug. 8, 2017, provisional application No. 62/542,081, filed on Aug. 7, 2017, provisional application No. 62/542,066, filed on Aug. 7, 2017, provisional application No. 62/541,363, filed on Aug. 4, 2017, provisional application No. 62/541,386, filed on Aug. 4, 2017, provisional application No. 62/540,299, filed on Aug. 2, 2017, provisional application No. 62/537,084, filed on Jul. 26, 2017, provisional application No. 62/509,479, filed on May 22, 2017, provisional application No. 62/482,792, filed on Apr. 7, 2017, provisional application No. 62/481,888, filed on Apr. 5, 2017.

(51) Int. Cl.

| | | |
|---|---|---|
| *G06Q 30/00* | (2012.01) | |
| *G06F 21/60* | (2013.01) | |
| *G07C 5/00* | (2006.01) | |
| *G07C 5/08* | (2006.01) | |
| *H04L 9/30* | (2006.01) | |

(52) U.S. Cl.
CPC ............ *G07C 5/008* (2013.01); *G07C 5/085* (2013.01); *G07C 5/0816* (2013.01); *H04L 9/30* (2013.01); *G06Q 2220/00* (2013.01)

(58) Field of Classification Search
USPC ....................................................... 713/153
See application file for complete search history.

(56) References Cited

U.S. PATENT DOCUMENTS

| | | | |
|---|---|---|---|
| 8,145,574 | B1 | 3/2012 | Hancock et al. |
| 8,364,505 | B1 | 1/2013 | Kane et al. |
| 8,799,034 | B1 | 8/2014 | Brandmaier et al. |
| 8,799,036 | B1 | 8/2014 | Christensen et al. |
| 8,868,288 | B2 | 10/2014 | Plante et al. |
| 9,014,915 | B2 | 4/2015 | Chatterjee et al. |
| 9,508,200 | B1 | 11/2016 | Mullen et al. |
| 9,558,601 | B2 | 1/2017 | Lu et al. |
| 9,904,928 | B1 | 2/2018 | Leise |
| 10,019,857 | B1 | 7/2018 | Mcquillen et al. |
| 10,115,164 | B1 | 10/2018 | Binion et al. |
| 10,121,204 | B1 | 11/2018 | Brandmaier et al. |
| 10,249,194 | B2* | 4/2019 | Erickson ............... G08G 1/163 |
| 10,475,105 | B1 | 11/2019 | Anderson et al. |
| 10,521,780 | B1 | 12/2019 | Hopkins, III et al. |
| 2003/0009270 | A1 | 1/2003 | Breed |
| 2003/0112133 | A1 | 6/2003 | Webb et al. |
| 2004/0030497 | A1 | 2/2004 | Knoop et al. |
| 2005/0177337 | A1 | 8/2005 | Beyer et al. |
| 2005/0209757 | A1 | 9/2005 | Kueblbeck et al. |
| 2007/0282735 | A1 | 12/2007 | Schuebert |
| 2008/0255887 | A1 | 10/2008 | Gruter |
| 2009/0300065 | A1 | 12/2009 | Birchall |
| 2011/0304447 | A1 | 12/2011 | Marumoto |
| 2012/0123806 | A1 | 5/2012 | Schumann, Jr. et al. |
| 2012/0259504 | A1 | 10/2012 | Lowrey et al. |
| 2013/0300552 | A1 | 11/2013 | Chang |
| 2014/0172467 | A1 | 6/2014 | He et al. |
| 2014/0306826 | A1 | 10/2014 | Ricci |
| 2015/0019533 | A1 | 1/2015 | Moody et al. |
| 2015/0154711 | A1 | 6/2015 | Christopulos et al. |
| 2015/0224845 | A1 | 8/2015 | Anderson et al. |
| 2015/0324924 | A1 | 11/2015 | Wilson et al. |
| 2015/0332407 | A1 | 11/2015 | Wilson, II et al. |
| 2015/0379510 | A1 | 12/2015 | Smith |
| 2016/0012539 | A1 | 1/2016 | Gorelov |
| 2016/0036899 | A1 | 2/2016 | Moody et al. |
| 2016/0171599 | A1 | 6/2016 | Bray et al. |
| 2016/0264115 | A1 | 9/2016 | Schwindt et al. |
| 2016/0371771 | A1 | 12/2016 | Serrano et al. |
| 2017/0048216 | A1 | 2/2017 | Chow et al. |
| 2017/0053460 | A1 | 2/2017 | Hauser et al. |
| 2017/0090480 | A1 | 3/2017 | Ho et al. |
| 2017/0124781 | A1 | 5/2017 | Douillard et al. |
| 2017/0236127 | A1 | 8/2017 | Tahir et al. |
| 2017/0337573 | A1 | 11/2017 | Toprak et al. |
| 2017/0365165 | A1 | 12/2017 | Landfors et al. |
| 2018/0018723 | A1 | 1/2018 | Nagla et al. |
| 2018/0067488 | A1 | 3/2018 | Pollach et al. |
| 2018/0144340 | A1 | 5/2018 | Kinnaird et al. |
| 2018/0165758 | A1 | 6/2018 | Saxena et al. |
| 2018/0176757 | A1 | 6/2018 | Kaindl et al. |
| 2018/0253464 | A1 | 9/2018 | Kohli et al. |
| 2018/0330417 | A1* | 11/2018 | Wollmer ............... G06Q 40/025 |
| 2019/0007484 | A1 | 1/2019 | Chen et al. |
| 2019/0036946 | A1 | 1/2019 | Ruvio et al. |
| 2020/0110828 | A1 | 4/2020 | Slater et al. |

OTHER PUBLICATIONS

HashCoin Uses Emercoin Blockchain for Vehicle Registration and Tracking. Retrieved from the internet at: <URL: https://cointelegraph.com/news/hashcoin-uses-emercoin-blockchain-for-vehicle-registration-and-tracking (2018).

driving-tests.org "VIN Decoder & Lookup", retrieved from the internet at: <URL:https://driving-tests.org.vin-decoder>, (2020).

Erik Voorhees, "It's all about the blockchain", retrieved from the internet at: <URL:https://moneyandstate.com/its-all-about-the-blockchain/> (2015).

Business Innovation, "The future of blockchain in 8 charts", retrieved from the internet at: <URL:https://www.raconteur.net/business-innvoation/the-future-of-blockchain-in-8-charts> (2016).

Lansiti et al., "The truth about blockchain", retrieved from the internet at: <URL:https://hbr.org/2017/01/the-truth-about-blockchain> (2017).

Jemima Kelly, "UBS leads team of banks working on blockchain settlement system", retrieved from the internet at: <URL:https://www.reuters.com/articles/us-banks-blockchain-ubs-idUSKCN10Z147> (2016).

U.S. Appl. No. 15/899,724, filed Feb. 20, 2018, William J. Leise et al.

U.S. Appl. No. 15/899,771, filed Feb. 20, 2018, William J. Leise et al.

U.S. Appl. No. 15/899,829, filed Feb. 20, 2018, William J. Leise et al.

U.S. Appl. No. 15/899,857, filed Feb. 20, 2018, William J. Leise et al.

U.S. Appl. No. 15/899,894, filed Feb. 20, 2018, William J. Leise et al.

U.S. Appl. No. 15/899,957, filed Feb. 20, 2018, William J. Leise et al.

U.S. Appl. No. 15/899,998, filed Feb. 20, 2018, William J. Leise et al.

U.S. Appl. No. 15/900,054, filed Feb. 20, 2018, William J. Leise et al.

Becker, Technical: recalibration—A mandatory procedure, BodyShop Business, (2016).

Blockchain Technology in the Insurance Sector, Quarterly Meeting of the Federal Advisory Committee on Insurance (FACI), McKinsey & Company, Jan. 5, 2017.

* cited by examiner

SYSTEMS AND METHODS FOR FEATURE-BASED RATING VIA BLOCKCHAIN

CROSS-REFERENCE TO RELATED APPLICATIONS

This application claims priority to and the benefit of the filing date of the following applications: (1) provisional U.S. Patent Application No. 62/481,888 entitled "Using a Blockchain for Vehicle Lifecycle Processes," filed on Apr. 5, 2017; (2) provisional U.S. Patent Application No. 62/482,792 entitled "Using a Blockchain for Vehicle Lifecycle Processes," filed on Apr. 7, 2017; (3) provisional U.S. Patent Application No. 62/509,479 entitled "Using a Blockchain for Vehicle Lifecycle Processes," filed on May 22, 2017; (4) provisional U.S. Patent Application No. 62/537,084 entitled "Systems and Methods for Maintaining Transferability of Title via Blockchain," filed on Jul. 26, 2017; (5) provisional U.S. Patent Application No. 62/540,299 entitled "Systems and Methods for Recall Compliance via Blockchain," filed on Aug. 2, 2017; (6) provisional U.S. Patent Application No. 62/541,386 entitled "Systems and Methods for Feature-Based Rating via Blockchain," filed on Aug. 4, 2017; (7) provisional U.S. Patent Application No. 62/541,363 entitled "Systems and Methods for Sensor Recalibration via Blockchain," filed on Aug. 4, 2017; (8) provisional U.S. Patent Application No. 62/542,066 entitled "Systems and Methods for Total Loss Handling via Blockchain," filed on Aug. 7, 2017; (9) provisional U.S. Patent Application No. 62/542,081 entitled "Systems and Methods for Analyzing Vehicle Financing via Blockchain," filed on Aug. 7, 2017; (10) provisional U.S. Patent Application No. 62/542,456 entitled "Systems and Methods for Usage Based Insurance via Blockchain," filed on Aug. 8, 2017; (11) provisional U.S. Patent Application No. 62/542,477 entitled "Systems and Methods for Estimating Vehicle Value via Blockchain," filed on Aug. 8, 2017; and (12) provisional U.S. Patent Application No. 62/542,496 entitled "Systems and Methods for Post-Collision Vehicle Routing via Blockchain," filed on Aug. 8, 2017. The entire contents of each of the preceding applications are hereby expressly incorporated herein by reference.

Additionally, the present application is related to the following co-pending U.S. patent applications: (1) U.S. patent application Ser. No. 15/899,724 entitled "Systems and Methods for Maintaining Transferability of Title via Blockchain," filed Feb. 20, 2018; (2) U.S. patent application Ser. No. 15/899,771 entitled "Systems and Methods for Recall Compliance via Blockchain," filed Feb. 20, 2018; (3) U.S. patent application Ser. No. 15/899,799 entitled "Systems and Methods for Feature-Based Rating via Blockchain," filed Feb. 20, 2018; (4) U.S. patent application Ser. No. 15/899,829 entitled "Systems and Methods for Sensor Recalibration via Blockchain," filed Feb. 20, 2018; (5) U.S. patent application Ser. No. 15/899,857 entitled "Systems and Methods for Total Loss Handling via Blockchain," filed Feb. 20, 2018; (6) U.S. patent application Ser. No. 15/899,894 entitled "Systems and Methods for Analyzing Vehicle Financing via Blockchain," filed Feb. 20, 2018; (7) U.S. patent application Ser. No. 15/899,957 entitled "Systems and Methods for Usage Based Insurance via Blockchain," filed Feb. 20, 2018; (8) U.S. patent application Ser. No. 15/899,957 entitled "Systems and Methods for Estimating Vehicle Value via Blockchain," filed Feb. 20, 2018; and (9) U.S. patent application Ser. No. 15/900,054 entitled "Systems and Methods for Post-Collision Vehicle Routing via Blockchain," filed Feb. 20, 2018.

TECHNICAL FIELD

Systems and methods are disclosed with respect to using a blockchain for vehicle lifecycle processes, specifically, a safety-feature product generation process.

BACKGROUND

Vehicles undergo a variety of information exchange periods during their lifecycle. Some of these information exchange periods are brought on by accidents, sales, or the eventual destruction of the vehicle. Managing the vehicle life cycle process involves multiple participants exchanging a variety of information. The number of interactions between these parties means the parties have to provide and validate information sent and received relevant to the vehicle. Theses interactions often occur between businesses and consumers, or businesses and other businesses.

Interactions between a business and a customer typically require validation of one or more pieces of information before a transaction can take place. This validation is often achieved by the participants involved in the interaction contacting a central authority that is a trusted source of truth for the particular piece of information to be validated. The central authority may then validate, or not validate, the particular piece of information and communicate its findings to the participants. Based upon the validation, or lack of validation, a consensus among the participants is formed and, assuming the information is valid, the transaction between the participants may take place, and subsequently be recorded.

Traditionally, businesses, customers, and central authorities have stored information related to transactions, and records of transactions, in databases, or ledgers which have been used in accounting to track transactions and information related to those transactions. Often these databases or ledgers held by the participants must be reconciled to achieve consensus as to the validity of the information stored in the databases and ledgers. Alternatively, as described above, the central authority may be responsible for determining the validity of information stored in a database or a ledger and functioning as an arbiter of consensus for interested parties.

A blockchain is a way of achieving a distributed consensus on the validity or invalidity of information. As opposed to using a central authority, a blockchain is a distributed database, or ledger, in which a transactional record is maintained at each node of a peer to peer network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional system which uses a central authority, a single party cannot unilaterally alter the distributed ledger. This inability to modify past transactions leads to blockchains being generally described as trusted, secure, and immutable.

Blockchains are typically deployed in an open, decentralized, and permissionless manner meaning that any party may view information, submit new information, or join the blockchain as a node responsible for confirming information. This open, decentralized, and permissionless approach to a blockchain has limitations. As an example, these blockchains may not be good candidates for interactions that require information to be kept private, such as information related to a vehicle lifecycle process, or for interactions that require all participants to be vetted prior to their participation.

BRIEF SUMMARY

In one aspect, a computer-implemented method for safety feature-based rating for a vehicle utilizing a blockchain may be provided. The blockchain may be maintained by a plurality of participants and including a plurality of Vehicle Identification Number (VIN) records (or other vehicle identifier records) respectively corresponding to a plurality of vehicles. The method may include (1) receiving, at one or more processors and/or associated transceivers coupled with a network interface (such as via wireless communication or data transmission over one or more radio frequency links or digital communication channels), a new vehicle type notification from a first participant, the new vehicle type notification indicating a set of safety features associated with a new vehicle type; (2) accessing, at a memory coupled with the one or more processors, the blockchain using the set of safety features to retrieve a first plurality of VIN (or other vehicle identifier) records that indicate a safety feature within the set of safety features; (3) accessing, at the memory coupled with the one or more processors, the blockchain to retrieve a second plurality of VIN (or other vehicle identifier) records corresponding to vehicles similar to vehicles corresponding to the first plurality of VIN (or other vehicle identifier) records, but lacking the safety feature within the set of safety features; (4) calculating, by the one or more processors, a safety rating for the safety feature by comparing VIN (or other vehicle identifier) lifecycle data associated with VIN (or other vehicle identifier) records within the first and second pluralities of VIN (or other vehicle identifier) records; and/or (5) generating, by the one more processors, a product associated with the new vehicle type based upon the generated safety rating for the safety feature, such as an insurance product covering the new vehicle type. The method may include additional, less, or alternate actions, including those discussed elsewhere herein.

For instance, in some embodiments, calculating the safety rating may include accessing, at the memory coupled with the one or more processors, the VIN (or other vehicle identifier) records within the first and second plurality of VIN (or other vehicle identifier) records to determine an overall distance traversed by vehicles corresponding to the VIN (or other vehicle identifier) records within the first and second pluralities of VIN (or other vehicle identifier) records; accessing, at the memory coupled with the one or more processors, the VIN (or other vehicle identifier) records within the first and second plurality of VIN (or other vehicle identifier) records to determine a number of collisions experienced by vehicles corresponding to the VIN (or other vehicle identifier) records within the first and second pluralities of VIN (or other vehicle identifier) records; and/or calculating, by the one or more processors, a collision rate for the first and second pluralities of VIN (or other vehicle identifier) records based upon the respective overall distances traversed and the numbers of collisions experienced.

In some embodiments, the method may include calculating, by the one or more processors, a safety rating for a plurality of safety features within the set of safety features by comparing VIN (or other vehicle identifier) lifecycle data associated with VIN (or other vehicle identifier) records within the first and second pluralities of VIN (or other vehicle identifier) records; and/or combining, by the one or more processors, the safety ratings for the plurality of safety features to generate a safety rating for the new vehicle type. Additionally or alternatively, generating the product associated with the new vehicle type may include generating, by the one more processors, the product associated with the new vehicle type based upon the generated safety rating for the new vehicle type.

In some further embodiments, the method may include verifying, by the one or more processors, a notification source for the new vehicle type notification by applying a public key associated with the first participant to decrypt at least one of (i) the new vehicle type notification, or (ii) a digital signature included in the new vehicle type notification.

In some embodiments, the method may include receiving, at the one or more processors coupled with the network interface, a product request notification from a second participant, the product request notification indicating the new vehicle type; generating, at the one or more processors, an offer for the generated product; and/or transmitting, via the one or more processors coupled with the network interface, the offer to the second participant. Additionally or alternatively, the method may include verifying, by the one or more processors, a notification source for the product request notification by applying a public key associated with the first participant to decrypt at least one of (i) the product request notification, or (ii) a digital signature included in the product request notification.

In some further embodiments, accessing the blockchain using the set of safety features may include accessing, at the memory coupled with the one or more processors, the blockchain using a software version for a safety feature within the set of safety features. Additionally or alternatively, accessing the blockchain to retrieve a second plurality of VIN (or other vehicle identifier) records may include accessing, at the memory couple with the one or more processors, the blockchain to retrieve the second plurality of VIN (or other vehicle identifier) records corresponding to vehicles having a prior software version for the safety feature than the safety feature included in the set of safety features.

Systems or computer-readable media storing instructions for implementing all or part of the methods described above may also be provided in some aspects. Systems for implementing such methods may include one or more of the following: a special-purpose assessment computing device, a mobile computing device, an on-board computer, a remote server, one or more sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1A:
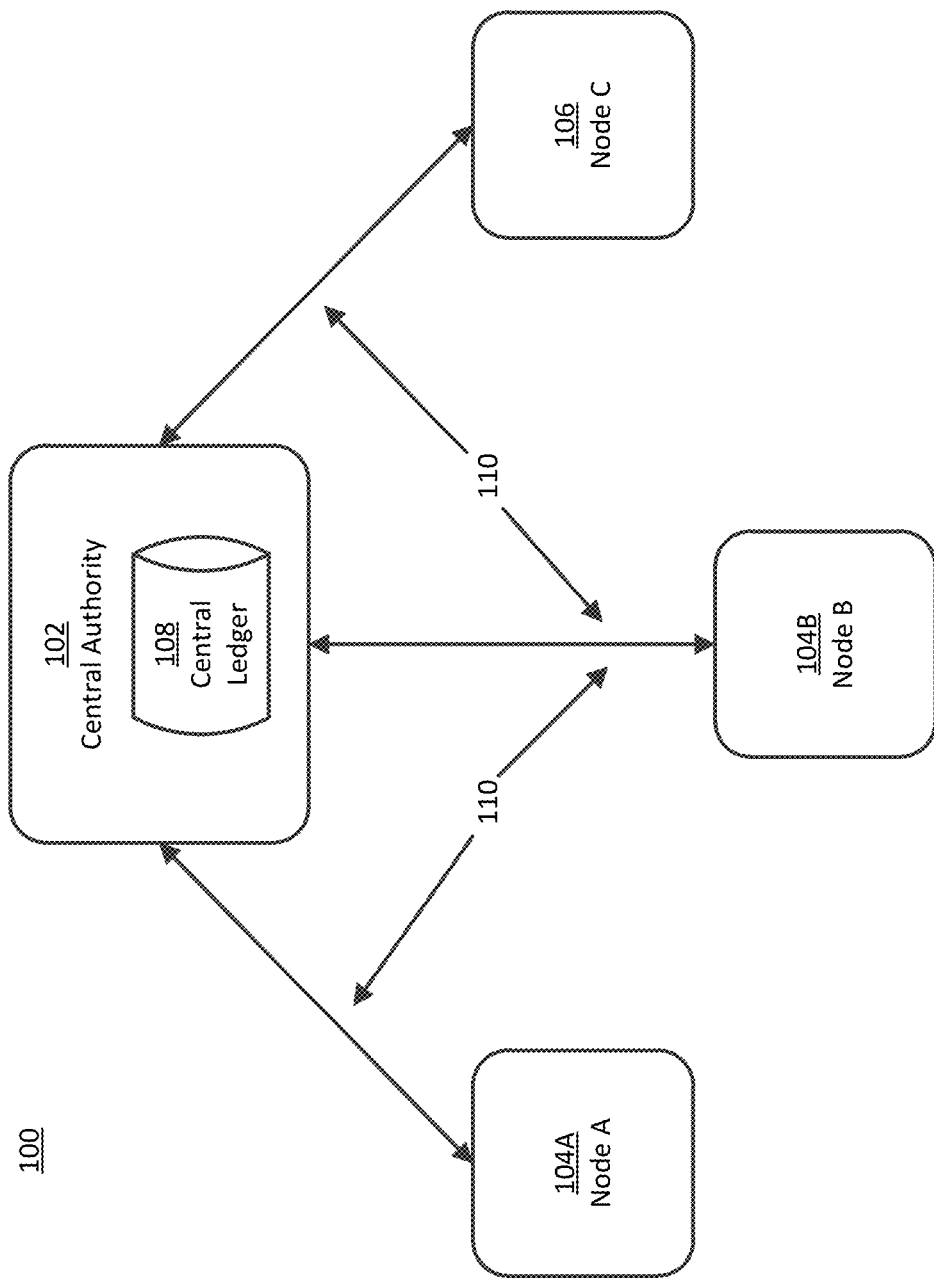
FIG. 1A depicts an exemplary centralized database system 100 in accordance with one aspect of the present disclosure.

The figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present embodiments relate to, inter alia, systems and methods for using a blockchain to record information related to processes and services in the automotive industry. For example, a blockchain may be used to manage the automotive claims process, a vehicle's loss history, and/or the lifecycle of a Vehicle Identification Number or other vehicle identifier. The systems and methods described herein allow for using a blockchain which gives the option for sharing private information with permissioned participants in the blockchain. In particular, the systems and methods allow for a distributed consensus amongst entities involved in the automotive industry such as businesses, consumers, and authorities, as to the validity of information and transactions stored on the blockchain.

Some exemplary, but not limiting, applications that may take advantage of the disclosed systems and methods relate to problems surrounding the automotive claims process, vehicle loss history, and/or the lifecycle of a Vehicle Identification Number or other vehicle identifier. Specifically, such applications may be: processing automotive insurance claims, tracking a vehicle's loss history, tracking a Vehicle Identification Number (or other vehicle identifier) over the course of the vehicle's life, transferring a vehicle title in a total loss scenario, subrogation transactions related to a vehicle accident, tracking a vehicle's usage history, changes to insurance coverage of the vehicle, administering Usage-Based Insurance (UBI), validating vehicle collision data, transferring a vehicle title, executing and processing travel insurance, interacting with original equipment manufacturers for a vehicle to comply with a vehicle recall, tracking a safety feature of autonomous features, detecting a need to recalibrate vehicle sensors, and/or tracking information from the national insurance crime bureau.

The above listed examples, and disclosed systems and methods, may use an application of distributed ledgers, where each new block may be cryptographically linked to the previous block in order to form a "blockchain," also referred to herein as a "shared ledger." More particularly, to create a new block, each transaction within a block may be assigned a hash value (i.e., an output of a cryptographic hash function, such as SHA-256 or MD5). These hash values may then be combined utilizing data storage and cryptographic techniques (e.g., a Merkle Tree) to generate a hash value representative of the entire new block, and, consequently, the transactions stored in the block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to certain aspects disclosed herein, information stored in blockchains can be trusted, because the hash value generated for the new block and a nonce value (an arbitrary number used once) are used as inputs into a cryptographic puzzle. The cryptographic puzzle may have a difficulty set by the nodes connected to the blockchain network, or the difficulty may be set by administrators of the blockchain network. In one example of the cryptographic puzzle, a solving node uses the hash value generated for the new block and repeatedly changes the value of the nonce until a solution for the puzzle is found. For example, finding the solution to the cryptographic puzzle may involve finding the nonce value that meets certain criteria (e.g., the nonce value begins with five zeros).

When a solution to the cryptographic puzzle is found, the solving node publishes the solution and the other nodes then verify that the solution is valid. Because the solution depends on the particular hash values for each transaction within the blockchain, if the solving node attempted to modify any transaction stored in the blockchain, the solution would not be verified by the other nodes. More specifically, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification.

Exemplary Database & Distributed Ledger

FIG. 1A depicts an exemplary centralized database system 100 in accordance with one aspect of the present disclosure. FIG. 1A includes a central authority 102, a plurality of nodes 104A, 104B, and 106, a central ledger 108, and a plurality of network connections 110. In one exemplary operation of the database system 100, one of the nodes, for example Node A 104A, issues a request to the central authority 102 to perform an action on data stored in the central ledger 108. This request may be a request to create, read, update, or delete data that is stored in the central ledger 108.

The central authority 102 receives the request, processes the request, makes any necessary changes to the data stored in the central ledger 108, and informs the requesting node, Node A 104A, of the status of the request. The central authority 102 may also send out status updates to the other nodes on the network about the change made, if any, to the data by Node A 104A. In the database system 100, all interaction with the data stored in the central ledger 108 occurs through the central authority 102. In this way, the central authority functions as a gatekeeper of the data.

Thus, the central authority 102 operates as a single point of entry for interacting with the data. Consequently, the central authority 102 represents a single point of failure for the entire centralized database system 100. To this end, if the central authority 102 is not accessible to the nodes in the database system 100, then the data stored in the central ledger 108 is not accessible. In another example, each individual node may maintain their own databases. In this example, at the end of the day, each node sends a copy of their respective database to the central authority 102. The central authority 102 may then reconcile the received databases to form a single cohesive record of the data stored in the central ledger 108.

Figure 1B:
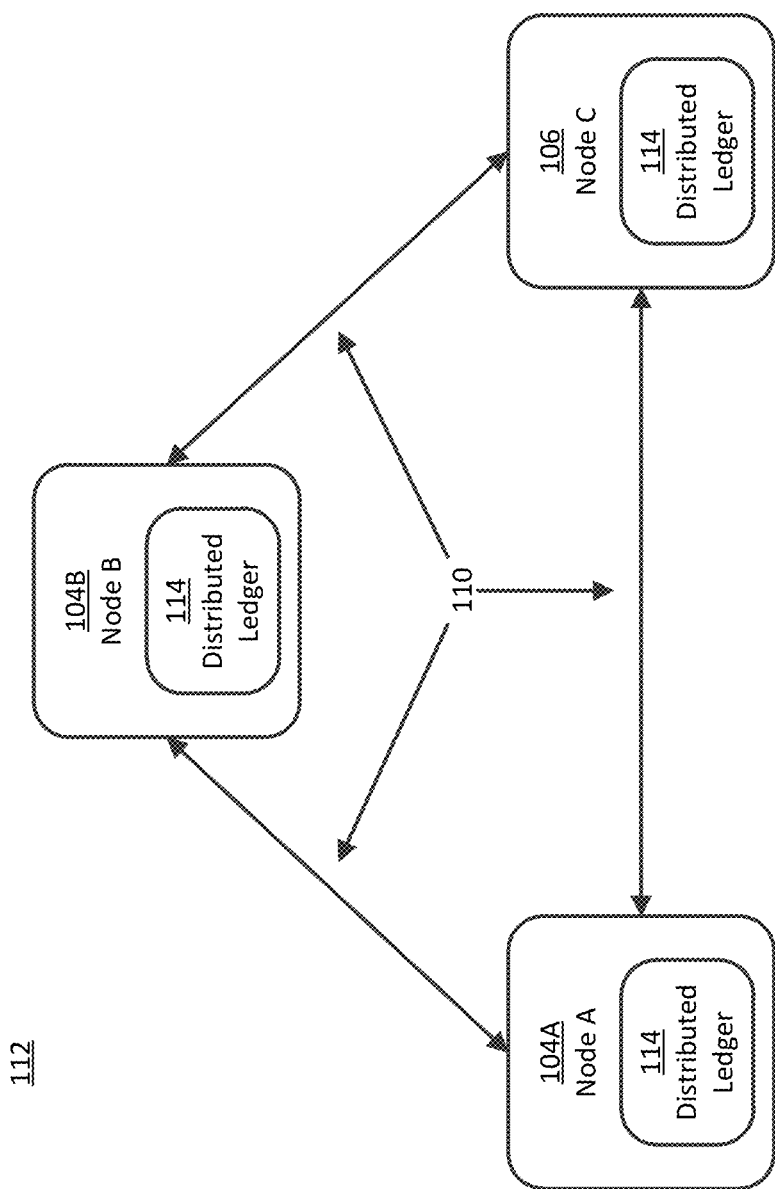
FIG. 1B depicts an exemplary distributed ledger system 112 in accordance with one aspect of the present disclosure.

Conversely, FIG. 1B depicts an exemplary distributed ledger system 112 in accordance with one aspect of the present disclosure. An example of a distributed ledger system 112 is the blockchain system described above. FIG. 1B includes a plurality of nodes 104A, 104B, and 106, a distributed ledger 114, and network connections 110. In a distributed ledger system 112, each node maintains a copy of the distributed ledger 114. As changes are made to the distributed ledger 114, each node updates their respective copy of the distributed ledger 114. A consensus mechanism may be used by the nodes in the distributed ledger system 112 to decide whether it is appropriate to make changes to the distributed ledger 114.

Therefore, each node has their own copy of the distributed ledger 114, which is identical to every other copy of the distributed ledger 114 stored by each other node. The distributed ledger system 112 is more robust than a central authority database system, because the distributed ledger system 112 is decentralized. As such, there is no single point of failure.

Exemplary Transaction Flow & Block Propagation Flow

Figure 2A:
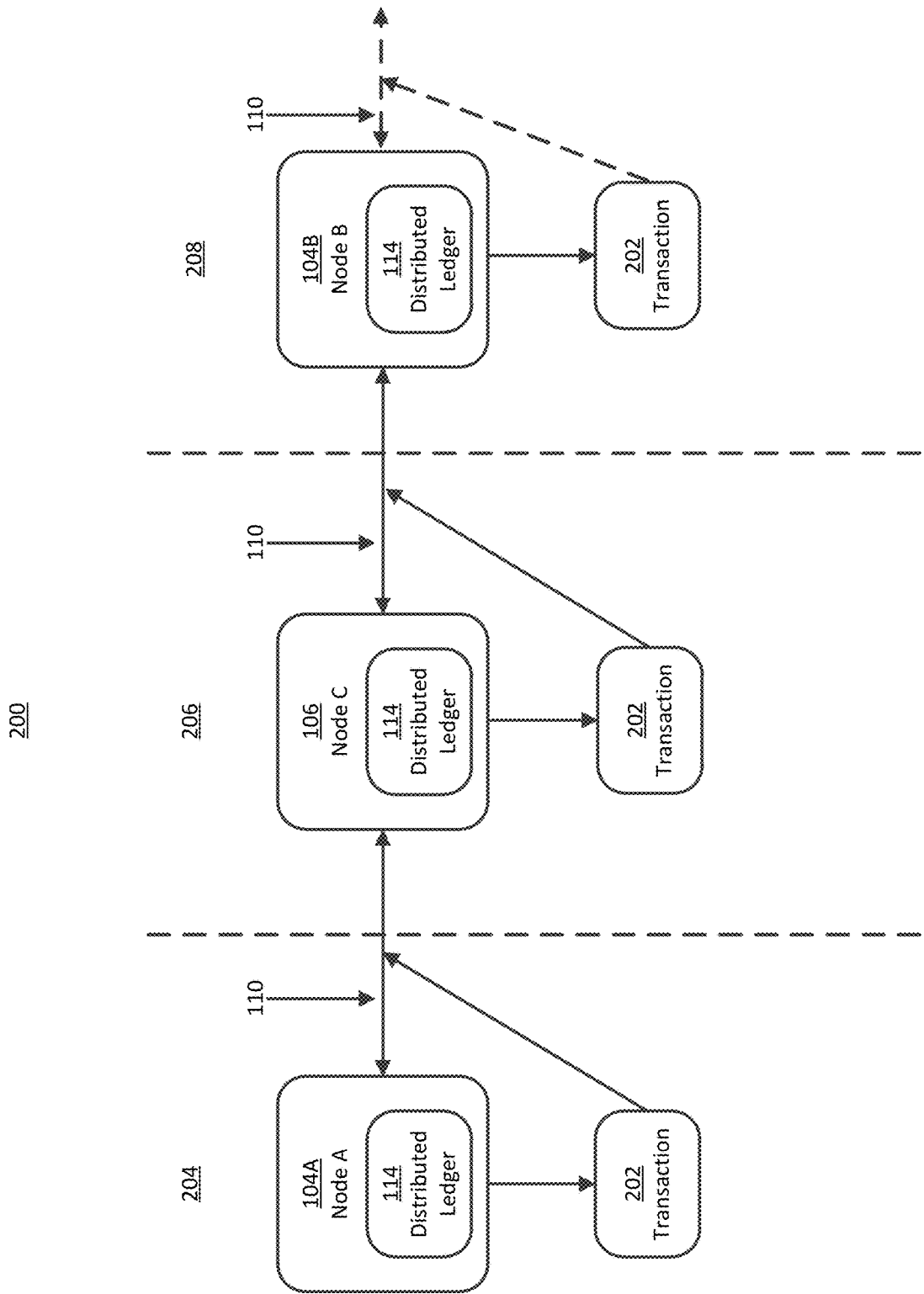
FIG. 2A depicts an exemplary transaction flow 200 in accordance with one aspect of the present disclosure.

FIG. 2A depicts an exemplary transaction flow 200 in accordance with one aspect of the present disclosure. FIG. 2A includes a transaction 202, three different time frames 204, 206, and 208, a set of nodes, network connections 110, and a distributed ledger 114. The transaction flow 200 may represent a sequential flow of a transaction through a network, such as the network depicted in FIG. 1B. For example, at time 204 Node A 104A generates a transaction 202.

The transaction 202 may use data that is stored in the distributed ledger 114, or the transaction 202 may use data received by the node from outside the distributed ledger 114. Node A 104A may transmit the newly generated transaction to Node C 106 via the network connection 110. At time 206, Node C 106 receives the transaction 202, and confirms that the information contained therein is correct. If the information contained in the transaction 202 is not correct Node C 106 may reject the transaction, and not propagate the transaction 202 through the system. If the information contained in the transaction 202 is correct Node C 106 may transmit the transaction 202 to its neighbor Node B 104B.

Similarly, at time 208, Node B 104B may receive the transaction 202 and either confirm or reject the transaction 202. In some embodiments, the Node B 104B may not transmit the confirmed transaction 202, because there are no further nodes to transmit to, and/or all the nodes in the network have already received transaction 202.

In some embodiments, at any of time frames 204, 206, or 208, any of the nodes may add the confirmed transaction 202 to their copy of the distributed ledger 114, or to a block of transactions stored in the distributed ledger. In some embodiments, confirming the transaction 202 includes checking cryptographic key-pairs for participants involved in the transaction 202. Checking the cryptographic key-pairs may follow a method laid out by a consensus protocol, such as the consensus protocol discussed in FIG. 1B.

Figure 2B:
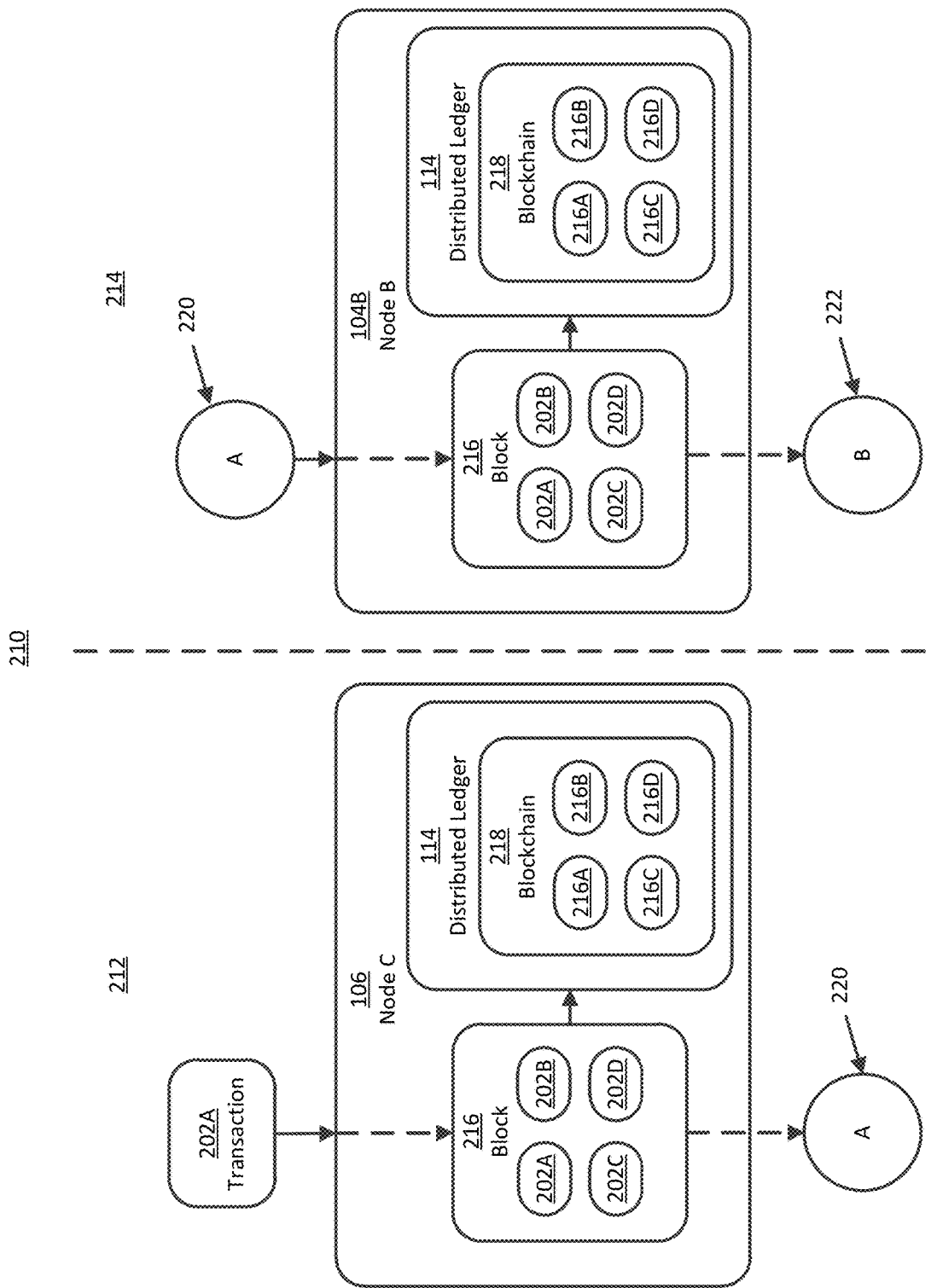
FIG. 2B depicts an exemplary block propagation flow 210 in accordance with one aspect of the present disclosure.

FIG. 2B depicts an exemplary block propagation flow 210 in accordance with one aspect of the present disclosure. FIG. 2B includes two time frames 212 and 214, Node C 106 and Node B 104B, a set of transactions 202A-202D, a set of blocks of transactions 216A-216D, a distributed ledger 114, and a blockchain 218. The block propagation flow 210 may follow the blockchain system described above, or may follow another blockchain propagation algorithm.

The block propagation flow 210 may begin with Node C 106 receiving transaction 202A at time 212. When Node C 106 confirms that transaction 202A is valid, the Node C 106 may add the transaction to a newly generated block 216. As part of adding the transaction 202A to block 216, Node C 106 may solve a cryptographic puzzle and include the solution in the newly generated block 216 as proof of the work done to generate the block 216. This proof of work may be similar to the proof of work described above which utilizes guessing a nonce value. In other embodiments, the transaction 202A may be added to a pool of transactions until a sufficient number of transactions in the pool exist to form a block. Node C 106 may transmit the newly created block 216 to the network at 220. Before or after propagating the block 216, Node C 106 may add the block 216 to its copy of the blockchain 218.

At time 214. Node B 104B may receive the newly created block 216. Node B 104B may verify that the block of transactions 216 is valid by checking the solution to the cryptographic puzzle provided in the block 216. If the solution is accurate then Node B 104B may add the block 216 to its blockchain 218 and transmit the block 216 to the rest of the network at 222.

Exemplary Sequence Diagram

Figure 3:
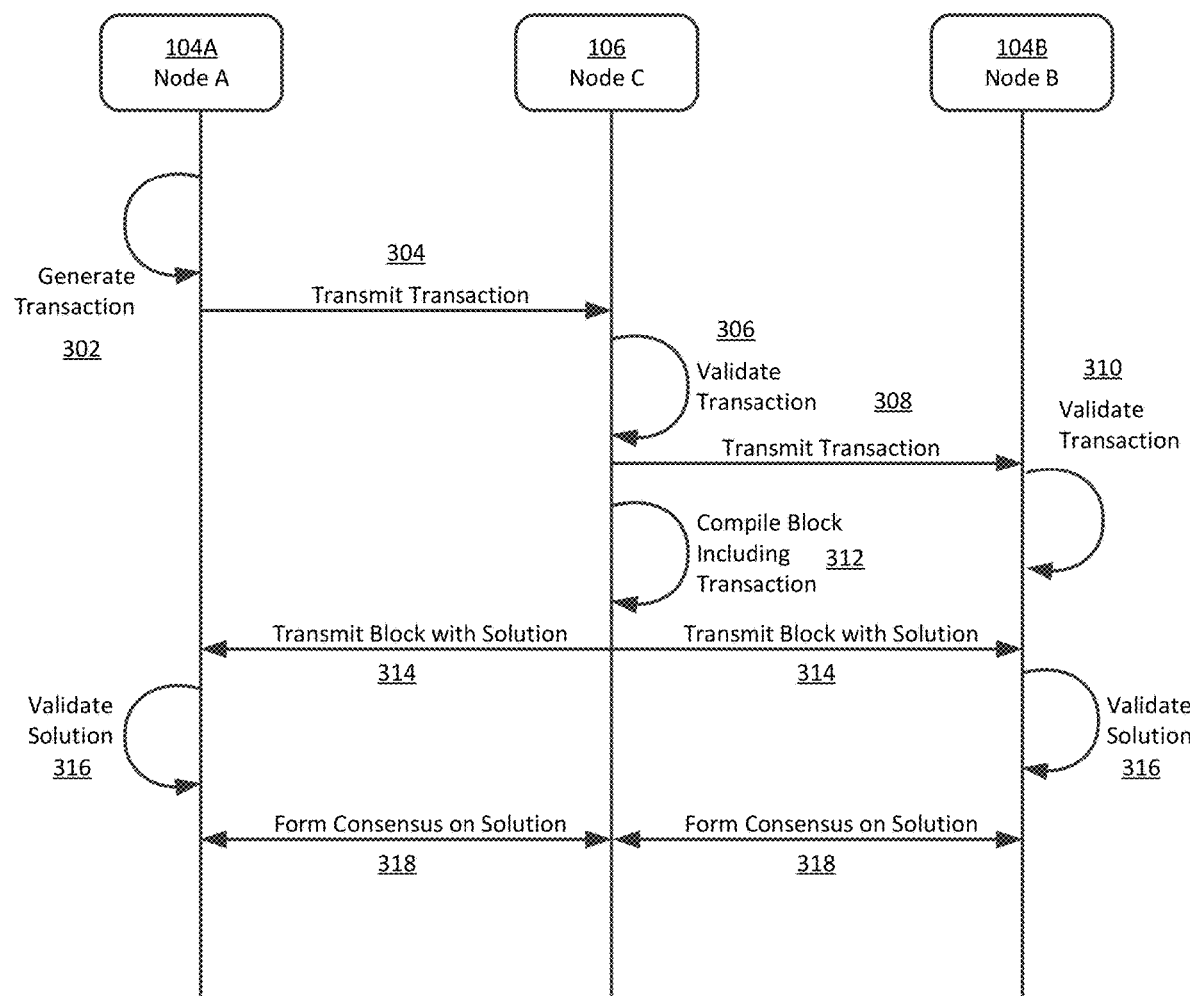
FIG. 3 depicts an exemplary sequence diagram 300 in accordance with one aspect of the present disclosure.

FIG. 3 depicts an exemplary sequence diagram 300 in accordance with one aspect of the present disclosure. FIG. 3 includes a set of nodes 104A, 104B, and 106. At 302, Node A 104A may generate a transaction. The transaction may be transmitted from Node A 104A to Node C 106 at 304. Node C 106 may validate the transaction at 306, and, if the transaction is valid, transmit the transaction at 308 to Node B 104B. Node B 104B may validate the transaction at 310. At 312, Node C 106 may compile a block including the validated transaction. Compiling a block may include generating a solution to a cryptographic puzzle, and linking the block to other blocks, as described in the embodiments above. Once the block is compiled, Node C 106 may transmit the block with the solution at 314 to both Node A 104A and Node B 104B.

Both Node A 104A and Node B 104B may then validate the solution to the block at 316. Verifying may include checking a cryptographic key-pair as described above. At 318 the three nodes form a consensus that the solution is valid, thereby forming a consensus on the blocks of transactions stored by all the nodes.

Exemplary Node

Figure 4:
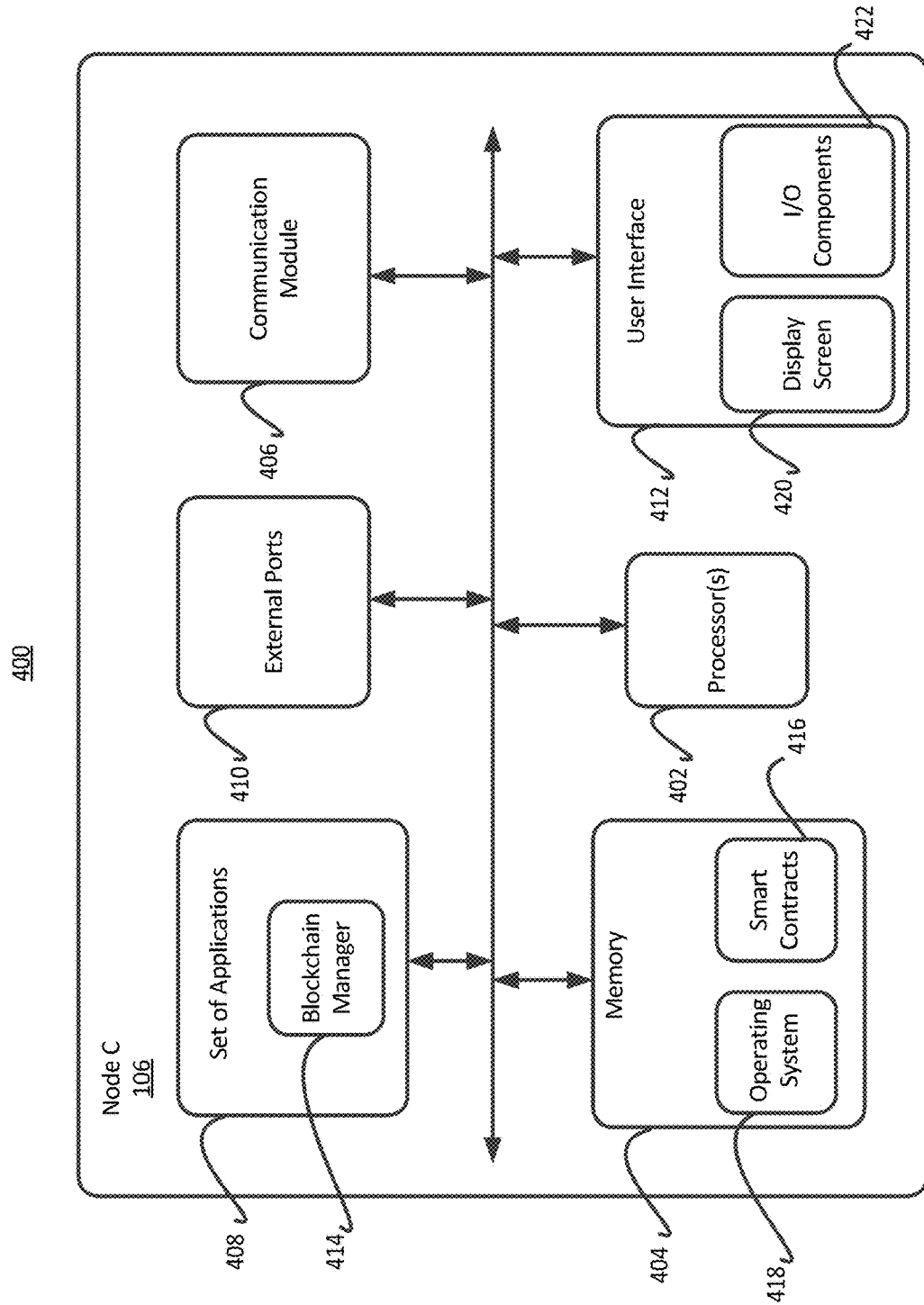
FIG. 4 depicts an exemplary node 400 in accordance with one aspect of the present disclosure.

FIG. 4 depicts an exemplary node 400 in accordance with one aspect of the present disclosure. In some embodiments, node 400 may be the same type of node as Node C 106 in FIGS. 1A-3. In other embodiments, node 400 may be the same type of node as Node A 104A and Node B 104B in FIGS. 1A-3. Node 400 may be capable of performing the functionality disclosed herein. In particular, node 400 may be utilized in the decentralized system described in FIG. 1B, the flows of transactions and blocks described in FIGS. 2A and 2B, and/or the blockchain system 500 described below in FIG. 5.

FIG. 4 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions or may broadcast transactions to other network nodes by using the blockchain manager 414. Similarly, the node 400 may use the blockchain manager 414 in conjunction with the smart contracts 416 stored in memory 404 to execute the functionality disclosed herein.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used as part of systems that interact with and/or manipulate data and transactions associated with the automotive claims process, the vehicle loss history process, and/or the Vehicle Identification Number (VIN) lifecycle process.

Exemplary Blockchain System

Figure 5:
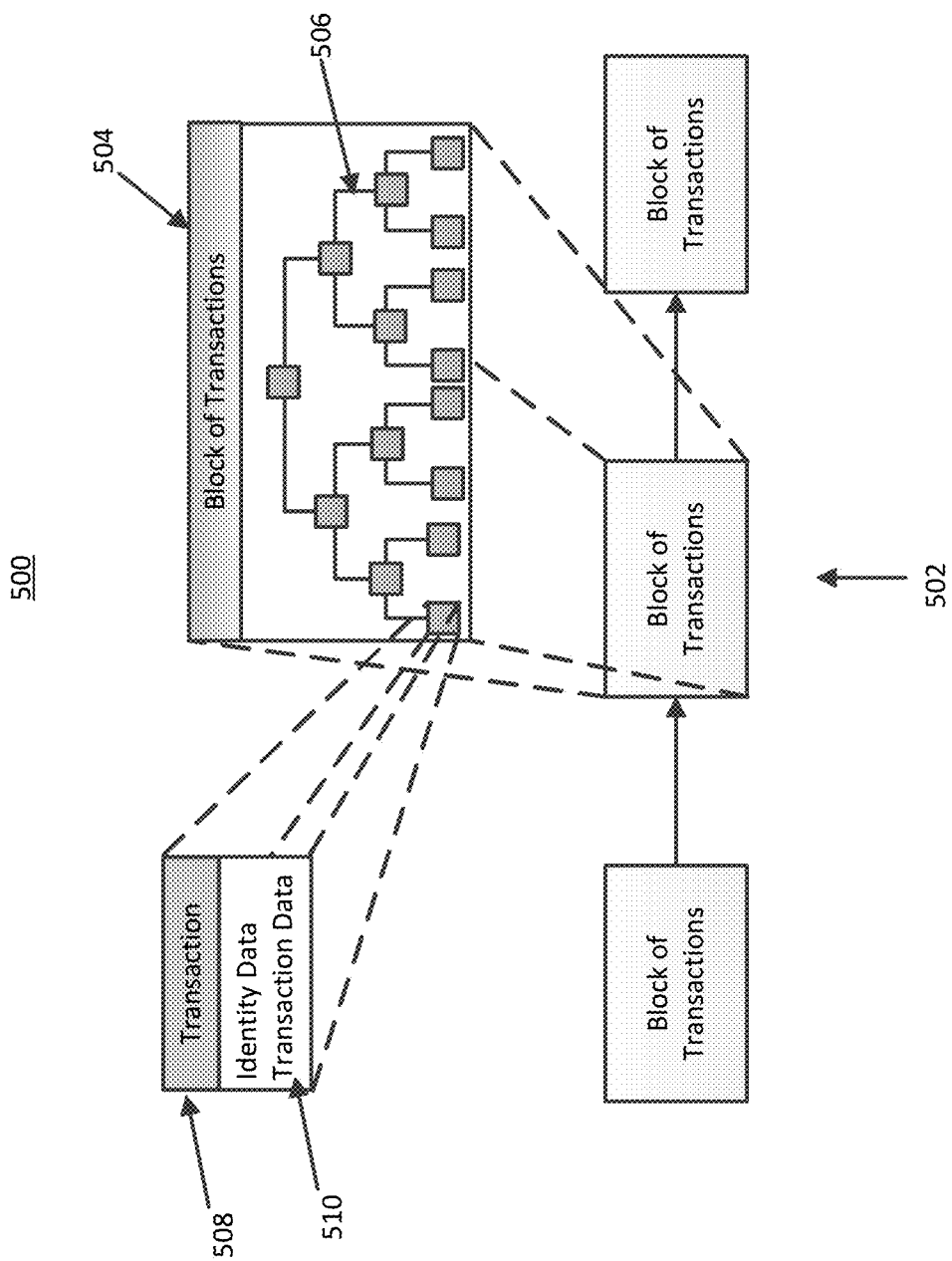
FIG. 5 depicts an exemplary blockchain 500 in accordance with one aspect of the present disclosure.

FIG. 5 depicts an exemplary blockchain system 500 in accordance with one aspect of the present disclosure. FIG. 5 includes a blockchain 502, a block of transactions 504, a Merkle Tree 506, and a transaction 508. The Merkle Tree may be the above-referenced Merkle Tree that cryptographically links transactions together. In other embodiments, the blockchain system 500 may utilize a different method of organizing transactions in a block. In some embodiments, the blockchain system 500 may include a plurality of blocks connected together to form a chain of blocks of transactions 502.

Each block of transactions 504 may include at least one transaction 508. In other embodiments, each block of transactions 504 may have a size limit that necessarily limits the number of transactions that the block may store. Each block of transactions 504 may include a reference to a previous block of transactions that was added to the blockchain 502 prior to the block of transactions 504 being added to the blockchain 502. As such, and as described above, each block of transactions 504 may be linked to every other block in the blockchain 502.

In some embodiments, the block of transactions 504 may organize the transactions it has received into a Merkle Tree 506 to facilitate access to the stored transactions. The transactions may be hashed using a cryptographic hash algorithm, such as the algorithms discussed above, and the hash of each transaction may be stored in the tree. As the tree is constructed, the hash of each adjacent node at the same level may be hashed together to create a new node that exists at a higher level in the tree. Therefore, the root of the tree, or the node at the top of the tree, may be dependent upon the hash of each transaction stored below in the tree. Each transaction 508 may include a set of data 510. The set of data 510 may include identifying data for the transaction, and transaction data identifying the nature of the transaction and what the transactions entails (e.g., input and output addresses, a transaction value, a document hash value, a timestamp, a transaction fee value, etc.).

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which may be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, in some jurisdictions, vehicle manufacturers may be assigned VIN (Vehicle Identification Number)

numbers at, or even after, the time of manufacture. Participants in a shared ledger may only wish for vehicle manufacturers to be able to broadcast transactions or blocks establishing new vehicles with assigned VIN numbers on the system. Since aspects of the present disclosure may rely on the immutable nature of a blockchain to track the VIN lifecycle, it may be undesirable for non-vehicle manufacturer participants to be able to modify or add a VIN number, or other type of vehicle identifier, including those discussed elsewhere herein.

In another implementation, information regarding the vehicle over the vehicle's lifetime may be added to the blockchain only by authorized participants, such as the vehicle owner or an authorized repair shop. In yet another implementation, certain information, such as telematics information may only be added to the blockchain by the vehicle itself, such as through an automated process initiated by an event (e.g., if the vehicle is in a crash, the vehicle broadcasts a transaction to the blockchain to store a hash of the vehicle's telematics data recorded over a period of time before the crash occurred).

If only certain network participants are authorized to broadcast transactions or add blocks to the blockchain, then one of the consensus rules of the network may be a proof-of-identity. One way to include a proof-of-identity of an entity broadcasting a transaction to the blockchain, or adding a block to the blockchain, is for the entity to cryptographically sign a message to prove the entity's identity.

In one implementation, an authorizing body may publish public cryptographic keys associated with network participants authorized to make certain changes to the blockchain. For example, an authorizing body may publish public cryptographic keys owned by vehicle manufacturers. When a vehicle manufacturer produces a new vehicle with a unique VIN number (or other vehicle identifier), the vehicle manufacturer may broadcast a transaction or message to the blockchain network that is signed with a private cryptographic key corresponding to the published cryptographic key. The authorizing body may issue the private cryptographic keys to authorized vehicle manufacturers. Alternatively, or additionally, the vehicle manufacturers may independently generate public/private cryptographic key pairs, and then provide the public key to the authorizing body for publication. If the vehicle manufacturers generate their own public/private key pairs, then security may be increased because no entity other than the vehicle manufacturer itself needs to ever be in possession of the manufacturer's private cryptographic key.

Validating network nodes may verify that the signed transaction or signed message was signed by the private cryptographic key corresponding to the published public cryptographic key owned by the authorized vehicle manufacturer. In at least one implementation, a valid proof-of-identity may be applied as a consensus rule by the blockchain network. As such, any transaction attempting to add a new VIN number (or other vehicle identifier) to the blockchain without a cryptographic proof-of-identity matching an identity authorized to add a new VIN number (or other vehicle identifier) is rejected by the network as non-compliant with the consensus rule.

In another implementation, no central authorizing body publishes a list of entities authorized to broadcast a transaction or add a block, but a broadcasting entity may still include a proof-of-identity in a transaction. As such, it may not be necessary to maintain a published list of entities and validate those entities with every new transaction or block because the identity of the broadcasting entity is recorded immutably on the blockchain, and may be verified at a later time if needed. For example, if a vehicle detects a crash event (e.g., deployed airbag, collision sensor, etc.), the vehicle may broadcast a transaction to the network with the vehicle's telematics data that is signed by a private key stored on the vehicle (e.g., in a hardware component on the vehicle dedicated to generation, storage, and management of private keys that only signs transactions and never transmits the private keys to other components of the vehicle). The identity of the vehicle that uploaded the telematics data may later be verified by another signed message from the vehicle even if the identity is not verified by the consensus rules of the blockchain network. Alternatively, or additionally, a vehicle may periodically sign messages with the vehicle's private cryptographic key to establish ownership of the private key (e.g., when paying a toll or fee on the blockchain, when receiving maintenance work or real-world verification of a state of the vehicle, such as a reading of the vehicle's mileage, etc.).

Reporting and Tracking the Auto Claim Process

In one embodiment, reporting and tracking events related to an automotive claims process may be conducted on a blockchain. The automotive insurance claims process may involve the following parties: a vehicle owner, an insurer, a repair facility, a parts supplier, a logistics provider, and/or a rental provider, and/or other parties. Presently, the process may involve a considerable amount of communication, and coordination back and forth between all of the relevant parties listed above. As such, the process may be time consuming, and there may be difficulties ensuring the correct information is received by the correct party at the correct time. By instituting the process on a blockchain, significant time and resource improvements may be obtained.

After a vehicle owner is in an accident, the claims process typically may begin when the insurer receives a loss report for the vehicle. The insurer may determine coverage based upon the loss report, triages the vehicle, and/or sends a repair assignment to a repair facility. Optionally, the insurer may assign a rental vehicle to the vehicle owner if applicable. The rental provider may provide the rental vehicle accordingly. Throughout the process, the vehicle owner provides authorization to repair the vehicle, and pay for such repairs, and pays a deductible.

At some point, a repair facility may take control of the vehicle. In some cases, the repair facility may provide a rental car, or substitute transportation to the vehicle owner. The repair facility secures authorization to repair the vehicle from the vehicle owner. Once this is secured, the repair facility identifies potential areas of prior damage/betterment, develops a repair plan, and prepares a repair estimate. The repair facility may request parts from suppliers, finalize any parts orders, update the estimate accordingly, and generally manage the repair of the vehicle. As part of the repair process, the repair facility may provide photographic evidence of the damage done to the vehicle. With the present embodiments, these photographs may then be uploaded to the blockchain after they have been hashed so as to ensure that any private information is protected, but also that the photographs provided are valid.

The insurer is largely responsible for determining the coverage, coordinating with the repair facility and rental provider, and for communicating with the vehicle owner. Additionally, in some of the present embodiments, the insurer may be a provider of the network on which the blockchain to manage the process is stored, or may be a participant on the network.

All of the participants in the network may be responsible for verifying or supplying information that is stored on the blockchain, and providing additional information to the blockchain to facilitate the auto claims process. For example, periodic updates to a state of the vehicle may be stored on the blockchain to track changing aspects of the vehicle according to the vehicle's VIN number (or other unique vehicle identifier) over time. For example, an insurance agreement may require a vehicle owner to periodically visit an authorized automotive service provider to collect information regarding the vehicle (e.g., emissions compliance, mileage, performance of scheduled maintenance, repairs, damage to the vehicle, etc.).

After collection of the information regarding the vehicle, the authorized automotive service provider may broadcast a transaction to the blockchain or add a new block to the blockchain to reflect an updated state of the vehicle. In at least one implementation, the automotive service provider may broadcast a transaction to the blockchain network to update status of a vehicle that the automotive service provider has measured by inspecting and/or working on the vehicle. As such, tracking status of a vehicle may be fraud-resistant because the automotive service provider may include a proof-of-identity in its transaction modifying the state of the vehicle.

Some of the network participants may function as nodes that validate new blocks and transactions, and compile transactions into blocks that are then added to the network (e.g., "full nodes"). Not all participants, however, need be nodes that compile transactions into blocks, and/or validate transactions and blocks received from other network participants. Participating in the network as a full node may incur costs in disk storage, computational resources, and/or bandwidth costs needed to exchange chain data with other network participants. Network participants who do not wish to incur these or other costs may rely on other network nodes to provide services that enable usage of the system ("simplified nodes"). For example, full nodes may make copies of the blockchain available for review and analysis (e.g., a "block explorer") to simplified nodes, full nodes may receive transactions from simplified nodes and propagate the transactions to other network participants, etc.

In one exemplary embodiment, the systems and methods disclosed may be used by a participant to receive a vehicle loss report, access a block stored on a blockchain to determine if information for the vehicle corresponding to the vehicle loss report is stored on the blockchain, analyze the received vehicle identifier notification, perform any necessary changes to information stored on the blockchain related to the vehicle and/or the vehicle loss report, and/or transmit the block where the vehicle information is stored, or a vehicle loss report is stored, to another participant on the network.

In some cases, updating and transmitting the block includes creating a new block with relevant information that will be added to the blockchain. In some embodiments, a node, such as the node 400 depicted in FIG. 4, may be the recipient of the vehicle loss report, and the node may be a part of a distributed ledger system, such as the system 112 of FIG. 1B. In some embodiments, a graphical user interface may be used to ensure that a user, or participant, may interact with the data presented, and more easily track the relevant data as it progresses through its process and is stored on the blockchain. Additionally, as part of the process any relevant title information, or any liens that are held against the vehicle, may be a part of the process.

Figure 6:
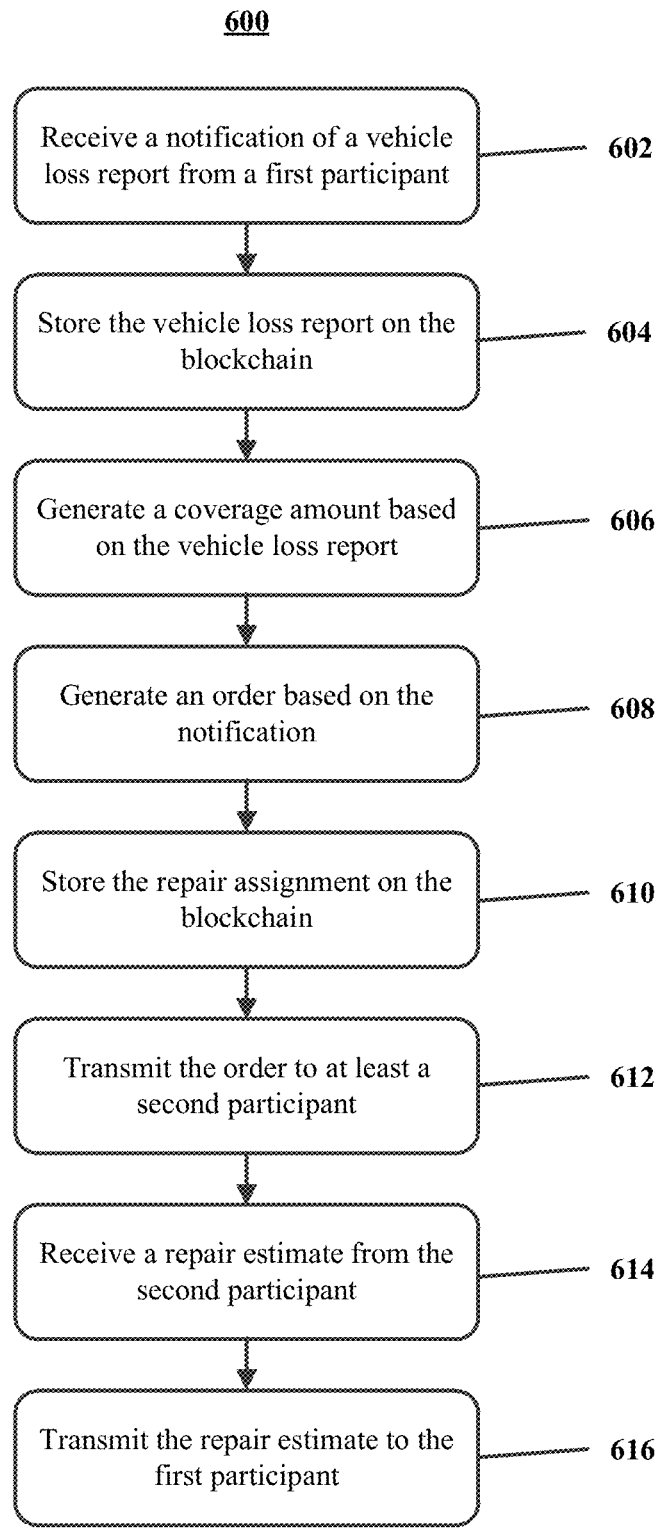
FIG. 6 depicts an exemplary flow diagram 600 associated with one aspect of the present disclosure.

Exemplary Computer-Implemented Method for Reporting and Tracking the Auto Claim Process FIG. 6 depicts an exemplary flow diagram 600 associated with one aspect of the present disclosure, in particular, using a blockchain for reporting and tracking events related to an automotive claims process among a network of participants. In some embodiments, the network of participants may be the nodes described above, for example, node 400 depicted in FIG. 4. The blockchain used by the participants may be the blockchain 500 depicted in FIG. 5, whose operation is described in FIGS. 2A, 2B, and 5. The steps of the computer-implemented method 600 may be performed by the nodes in the network of participants, such as the nodes described in FIGS. 1A-4. The method 600 may include additional, fewer, or alternative actions, including those described elsewhere herein.

The computer-implemented method 600 for reporting and tracking events related to an automotive claims process on a blockchain reported and tracked by a plurality of participants in the blockchain network may include (1) receiving, at a processor, a notification of a vehicle loss report (or other notification of a vehicle loss) from a first participant (602); (2) storing, at a memory coupled with the processor, the vehicle loss report on the blockchain (block 604); (3) generating, at the processor, a coverage amount based upon the vehicle loss report (block 606); (4) generating, at the processor, an order based upon the notification, wherein the order includes or comprises a repair assignment and a replacement vehicle request (block 608); (5) storing, at the memory, the repair assignment on the blockchain (610); (6) transmitting, at the processor, the order to at least a second participant (block 612); (7) receiving, at the processor, a repair estimate from the second participant (block 614); and/or (8) transmitting, at the processor, the repair estimate and the coverage amount to the first participant (block 616).

In some embodiments, the first participant is the vehicle owner, and in other embodiments the second participant is a repair facility. In other embodiments, both the first participant is the vehicle owner and the second participant is a repair facility.

In some embodiments, the computer-implemented method may include (i) receiving, at the processor, a repair approval from the first participant; (ii) transmitting, at the processor, the repair approval to the second participant; and/or (iii) storing, at the memory, the repair approval on the blockchain. Alternatively, the computer-implemented method may include (a) transmitting, at the processor, the order to a third participant, wherein the third participant is a rental provider; (b) receiving, at the processor, a rental bill from the third participant; and/or (c) storing, at the memory, the rental bill on the blockchain.

In yet other embodiments, prior to receiving the repair estimate, the method may include receiving, at the processor, a parts delivery notification from a fourth participant, wherein the fourth participant is a parts supplier; and/or storing, at the memory, the parts delivery notification on the blockchain. Similarly, in some embodiments, prior to receiving the repair approval, receiving, at the processor, a parts delivery confirmation from a fifth participant, wherein the fifth participant is a logistics provider; and/or storing, at the memory, the parts delivery confirmation on the blockchain.

In some embodiments, the method may include receiving, at the processor, a final repair bill from the second participant; and/or storing, at the memory, the final repair bill on the blockchain. Additionally, in some embodiments, the method may include, wherein if items are stored on the blockchain, updating, at the memory, a copy of the blockchain stored at the memory; and/or transmitting, via the network interface, the updated copy of the blockchain to at least one other participant. Similarly, some embodiments may include receiving, at the processor, a repair rejection from the first participant; transmitting, at the processor, the repair rejection to the second participant; and/or storing, at the memory, the repair rejection on the blockchain.

Vehicle Loss History

In one embodiment, reporting and tracking events related to a vehicle loss history, are stored on a blockchain maintained by a plurality of participants. The vehicle loss history may include information on the following parties: a vehicle owner, an insurer, a repair facility, a parts supplier, a logistics provider, and/or a rental provider, or other parties. Presently, the process may involve a considerable amount of communication, and coordination back and forth between potentially all of the relevant parties listed above. As such, the process may be time consuming, and there may be difficulties ensuring the correct information is received by the correct party at the correct time. In some instances, a user may be able to use a Vehicle Identification Number, or other unique vehicle identifier, including those discussed elsewhere herein, to acquire the loss history for that vehicle. By instituting the process for tracking and reporting on a blockchain, significant time and resource improvements may be obtained.

In one exemplary embodiment, the systems and methods disclosed may be used by a participant to (i) receive a loss history for a vehicle; (ii) access a block stored on a blockchain to determine if information for the vehicle is stored on the blockchain; (iii) analyze the received vehicle loss history; (iv) perform any necessary changes to information stored on the blockchain related to the vehicle and/or the vehicle loss history; and/or (v) transmit the block where the vehicle information is stored, or vehicle loss history is stored, to another participant on the network. In some cases, updating and transmitting the block comprises creating a new block with relevant information that will be added to the blockchain.

In some embodiments, a node, such as the node 400 depicted in FIG. 4, may be the recipient of the vehicle loss history, and the node may be a part of a distributed ledger system, such as the system 112 of FIG. 1B. In some embodiments, a graphical user interface may be used to ensure that a user, or participant, may interact with the data presented and more easily track as the relevant data progresses through its process and is stored on the blockchain. Additionally, as part of the process any relevant title information, or any liens that are held against the vehicle may be part of the process.

Exemplary Computer-Implemented Method for Vehicle Loss History

Figure 7:
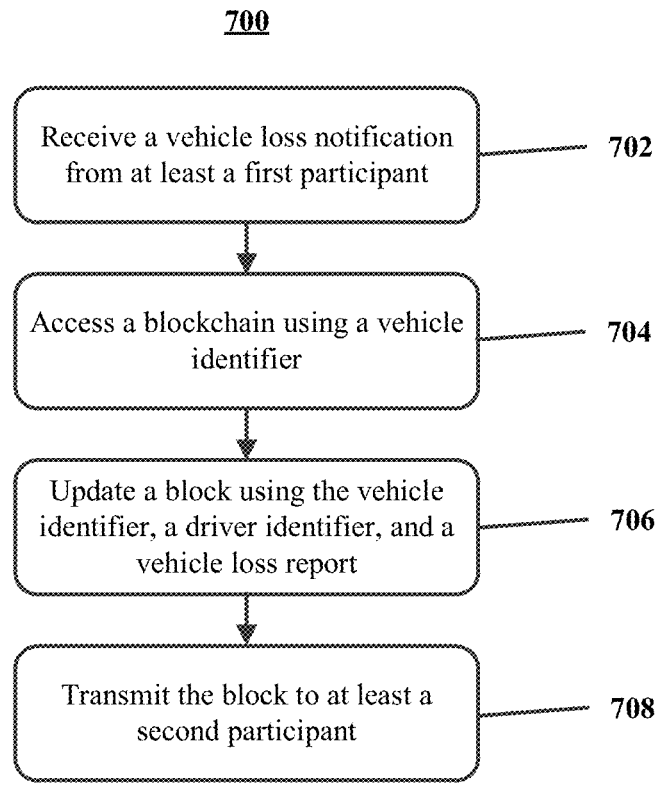
FIG. 7 depicts an exemplary flow diagram 700 associated with one aspect of the present disclosure.

FIG. 7 depicts an exemplary flow diagram 700 associated with one aspect of the present disclosure for tracking a vehicle loss history that is stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 700 may be performed by the nodes in the network of participants, such as the nodes described in FIGS. 1A-4. The method 700 may include additional, fewer, or alternative actions, including those described elsewhere herein.

The exemplary flow diagram 700 may include (1) receiving, at a processor coupled with a network interface, a vehicle loss notification from at least a first participant, wherein the vehicle loss notification comprises a vehicle identifier, a driver identifier, and/or a vehicle loss report (block 702); (2) accessing, at a memory coupled with a processor, the blockchain using the vehicle identifier (block 704); (3) updating, at the memory, a block stored at the memory using the vehicle identifier, the driver identifier, and/or the vehicle loss report (block 706); and/or (4) transmitting, via the processor coupled with the network interface, the block to at least a second participant (block 708).

The vehicle identifier may include those vehicle identifiers discussed elsewhere herein, such as Vehicle Identification Numbers (VINs), license plate numbers, vehicle build information, vehicle owner information, auto insurance policy number, vehicle address information, tax identification number, other insurance policy numbers, auto loan identification number, autonomous vehicle features or systems or technologies, semi-autonomous vehicle features or systems, or technologies, and/or other vehicle or driver identifiers. The driver identifier may include driver or owner SSN (Social Security Number), driver or employee number, driver or owner name, driver or owner address, insurance policy number, driver license number, and/or other driver or vehicle identifiers.

In some embodiments, the first participant is a sensor system attached to the vehicle. In other embodiments, the first participant is a repair shop. Similarly, in some embodiments, accessing the blockchain using the vehicle identifier may include: searching, at the processor, the blockchain using the vehicle identifier for a block which includes the vehicle identifier; and/or verifying, at the processor, the vehicle identifier stored at the block.

In other embodiments, if the vehicle identifier is not stored at a block, generating, at the processor, a vehicle record using the vehicle identifier; adding, at the processor, the vehicle identifier, the driver identifier, and the vehicle loss report to a vehicle loss transaction; linking, at the processor, the vehicle loss transaction and the vehicle record; adding, at the processor, the vehicle loss transaction to a set of vehicle loss transactions; and/or adding, at the processor, the set of vehicle loss transactions and the vehicle record to the block.

In some embodiments, updating the block may include: adding, at the processor, the vehicle identifier, the driver identifier, and the vehicle loss report to a vehicle loss transaction; adding, at the processor, the vehicle loss transaction to a set of vehicle loss transactions; and/or adding, at the processor, the set of vehicle loss transactions to the block.

In other embodiments, the method may include solving, at the processor, a cryptographic puzzle corresponding to the block; and/or adding, at the processor, the solution to the cryptographic puzzle to the block. Additionally, in some embodiments, updating, at the memory, the blockchain by adding the block to the blockchain.

In yet other embodiments of the method, the at least one other participant is an insurer, a vehicle owner, a repair shop, or combinations thereof. In some embodiments, the method may include receiving, at the processor, a repair notification from at least a third participant, wherein the third participant is a repair shop.

VIN Lifecycle

In one aspect, the systems and methods are directed to tracking a vehicle identifier on a blockchain maintained by a plurality of participants. In one embodiment, the vehicle identifier may be a Vehicle Identification Number, more commonly referred to as a VIN. The VIN may conform to a particular standard for Vehicle Identification Numbers, such as standards formulated and promulgated by, for example, the Federal Motor Vehicle Safety Standards, the International Standards Organization Standards, the Society of Automotive Engineers Standards, and/or the Australian Design Rules standards. These, and other, standards have particular information requirements that must be met for vehicles that are manufactured, imported/exported, or sold within particular jurisdictions.

Some of the information that these standards require for disclosure in the VIN are: a world manufacturer identifier, attributes of the vehicle (e.g., automotive platform used, the model for the vehicle, the body style of the vehicle, any safety features of the vehicle, self-driving features for the vehicle, autonomous vehicle characteristics for the vehicle), a vehicle model year, vehicle identifier information to identify that particular vehicle, any software or software versions for systems used by the vehicle or its components, and more particular information about the vehicle manufacturer. VINs may be used for many types of vehicles, such as, for example, individual motor vehicles, towed vehicles, motorcycles, scooters and mopeds.

The VIN may be reported to several agencies after the vehicle is manufactured, and throughout the lifecycle of the vehicle. For example, the VIN may be checked when a vehicle is sold, or when the vehicle is destroyed. Any updates to the vehicle may impact the VIN, and accordingly new information may need to be added to the blockchain, such as an odometer reading. By instituting the process for tracking the VIN from manufacture to salvage, aka "cradle to the grave," on a blockchain, significant time and resource improvements may be obtained.

In one exemplary embodiment, the systems and methods disclosed may be used by a participant to (i) receive a vehicle identifier notification; (ii) access a block stored on a blockchain to determine if information for the vehicle corresponding to the vehicle identifier notification is stored on the blockchain; (iii) analyze the received vehicle identifier notification; (iv) perform any necessary changes to information stored on the blockchain related to the vehicle and/or the vehicle identifier notification; and/or (v) transmit the block where the vehicle information is stored, or a vehicle identifier notification is stored, to another participant on the network.

In some cases, updating and transmitting the block may include creating a new block with relevant information that will be added to the blockchain. In some embodiments, a node, such as the node 400 depicted in FIG. 4, may be the recipient of the vehicle loss history, and the node may be a part of a distributed ledger system, such as the system 112 of FIG. 1B. In some embodiments, a graphical user interface may be used to enable a user, or participant, to interact with the data presented and to more easily track relevant data as it progresses through the disclosed processes. Additionally, any relevant title information, including any liens that are held against the vehicle, may be tracked as part of the VIN lifecycle process.

In one aspect, the transferability of title may be maintained through the VIN lifecycle process. To this end, several jurisdictions may require the current mileage of the vehicle to be reported in order to record the title transfer. Yet, when the vehicle has been in a significant collision, it may be difficult or impossible to retrieve this information from the vehicle itself. However, the VIN lifecycle process may be leveraged to associate the VIN with periodic mileage reports.

Thus, even if the vehicle experiences a significant collision, the mileage information may be determined based upon the record included in the distributed ledger. Of course, in addition to mileage, other information related to the transferability of title may be recorded as part of the VIN lifecycle process. For example, some jurisdictions may require the vehicle to have complied with a smog or other check, and/or is associated with a vehicle insurance policy. Accordingly, the documentation associated with these requirements may also be recorded to the distributed leger as part of the VIN lifecycle process.

In another aspect, the VIN lifecycle process may be utilized to track compliance with original equipment manufacturer (OEM) recalls. As described above, the VIN lifecycle process may include recording a vehicle type (e.g. make, model, and/or year) for each tracked VIN. Accordingly, a participant is able to readily query the blockchain for the VIN records corresponding to the recalled vehicle type, and record one or more transactions and/or events to the VIN record. For example, the participant may record a transaction and/or event relating to the recall notice, and/or about any communications sent to an entity associated with the vehicle. Further, some jurisdictions require that OEMs maintain documentation about efforts conducted to inform consumers as to a recall. Accordingly, recording the transactions and/or events to the corresponding VIN records may satisfy this jurisdictional requirement.

In yet another aspect, the VIN lifecycle process may enable an insurer to offer discounts for autonomous or semi-autonomous safety features (lane departure assistance, early braking, traffic jam autonomous mode, etc.) sooner than conventionally possible. The types of autonomous or semi-autonomous vehicle-related functionality or technology that may be used with the present embodiments and/or stored on blockchains may be related to at least the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In some embodiments, the autonomous or semi-autonomous vehicle functionality or technology for each vehicle may be added to a blockchain associated with that vehicle, and may be used as partial or complete vehicle identifiers.

Traditionally, insurance may be offered based upon vehicle type (make/model/year). When a new autonomous or semiautonomous safety feature is first introduced into a vehicle type, however, there may be generally insufficient data to determine whether or not the safety feature reduces the likelihood of an accident (and thus, the filing of a claim). Accordingly, traditionally insurers initially may offer insurance rates and/or other products based upon prior versions of the vehicle type that lack the safety feature.

On the other hand, the VIN lifecycle process may include an indication of any autonomous or semiautonomous safety feature included in a vehicle. For example, the indication may include information about a developer of the safety feature, a software version, and/or a date the current software version was installed. Accordingly, a safety record for the particular autonomous or semiautonomous features, as opposed to the vehicle type, may be developed by comparing vehicles having a similar vehicle type but have different sets of autonomous or semiautonomous safety features. As such, when a manufacturer introduces a new autonomous or semiautonomous safety feature into a particular make/model, an insurer may be able to accurately determine how much the autonomous or semiautonomous feature has reduced the likelihood of collisions in other vehicles. This information may then be used to offer drivers of the vehicle lower insurance rates than conventionally possible.

In still another aspect, the VIN lifecycle process may enable the detection of when one or more sensors need to be recalibrated. To this end, the VIN lifecycle process may record events and/or transactions associated with the triggering of an autonomous or semiautonomous safety feature. For example, an event and/or transaction may be generated each time a lane departure warning system is triggered. Accordingly, if a particular autonomous or semiautonomous safety feature is being triggered at an abnormal rate, it may be indicative that one or more sensors used to trigger the autonomous or semiautonomous safety feature need to be recalibrated.

Further, because the VIN lifecycle process may be applied to a plurality of vehicles of the same vehicle type, a sensor lifetime metric (e.g., a time and/or a mileage) may be determined for one or more sensors associated with the version of the autonomous or semiautonomous safety feature. Accordingly, if an abnormal trigger rate for an autonomous or semiautonomous safety feature is detected, the lifetime metric may be analyzed to determine whether it is more likely that a sensor needs recalibration or that the vehicle is being operated in an abnormal manner (e.g., the driver does not ordinarily drive the vehicle).

Exemplary Computer-Implemented Method for Vin Lifecycle

Figure 8:
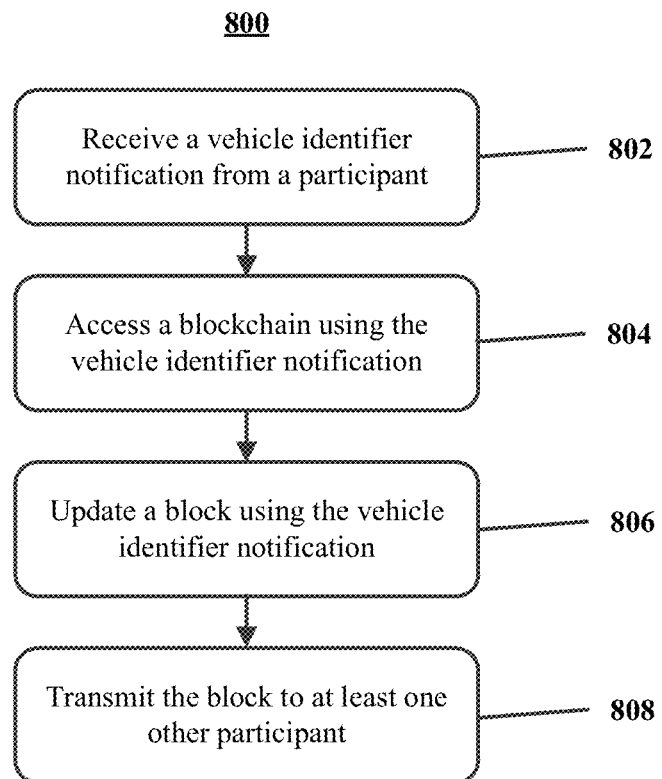
FIG. 8 depicts an exemplary flow diagram 800 associated with one aspect of the present disclosure.

FIG. 8 depicts an exemplary flow diagram 800 associated with one aspect of the present disclosure for tracking a vehicle identifier on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 800 may be performed by the nodes in the network of participants, such as the nodes described in FIGS. 1A-4. The method 800 may include additional, fewer, or alternative actions, including those described elsewhere herein.

The exemplary flow diagram 800 may include (1) receiving, at a processor coupled with a network interface, a vehicle identifier notification from a participant (block 802); (2) accessing, at a memory coupled with a processor, the blockchain using the vehicle identifier notification (block 804); (3) updating, at the memory, a block stored at the memory using the vehicle identifier notification (block 806); and/or (4) transmitting, via the processor coupled with the network interface, the block to at least one other participant (block 808).

In some embodiments, the vehicle identifier notification comprises or includes a notification source, a vehicle identifier set, and a notification event. Further, in some embodiments of the method, the vehicle identifier set may comprise or include a manufacturer, a descriptor section, and an identifier section, or other vehicle identifiers mentioned herein. Alternatively, the notification event may be, or be associated with, a vehicle transfer, a vehicle accident, a vehicle repair incident, a vehicle modification, or combinations thereof.

In some embodiments, accessing the blockchain using the vehicle identifier notification may include: verifying, at the processor, a notification source for the vehicle identifier notification; identifying, at the processor, an entry in the blockchain corresponding to the vehicle identifier notification; and/or accessing, at the memory, the entry in the blockchain corresponding to the vehicle identifier notification.

In other embodiments, updating the blockchain using the vehicle identifier notification may include: verifying, at the processor, that an entry in the blockchain corresponding to the vehicle identifier notification exists; and/or wherein if the entry does not exist, adding, at the memory, an entry in the blockchain corresponding to the vehicle identifier notification.

An alternative embodiment of the method may include tracking a vehicle identifier on a blockchain maintained by a plurality of participants. The method may include: (i) receiving, at a processor coupled with a network interface, a vehicle identifier notification from a participant; (ii) accessing, at a memory coupled with a processor, the blockchain using the vehicle identifier notification; (iii) updating, at the memory, a block stored at the memory using the vehicle identifier notification; (iv) generating, at the processor, a solution to a cryptographic puzzle involving the block; and/or (v) transmitting, via the processor coupled with the network interface, the block and the solution to the cryptographic puzzle to at least one other participant.

In some embodiments, accessing the blockchain using the vehicle identifier notification may include: (a) verifying, at the processor, a notification source for the vehicle identifier notification; (b) identifying, at the processor, an entry in the blockchain corresponding to the vehicle identifier notification; and/or (c) accessing, at the memory, the entry in the blockchain corresponding to the vehicle identifier notification. Furthermore, in some embodiments, updating the blockchain using the vehicle identifier notification may include: verifying, at the processor, that an entry in the blockchain corresponding to the vehicle identifier notification exists; and/or wherein if the entry does not exist, adding, at the memory, an entry in the blockchain corresponding to the vehicle identifier notification.

Exemplary Computer-Implemented Method for Transferability of Title

Figure 9:
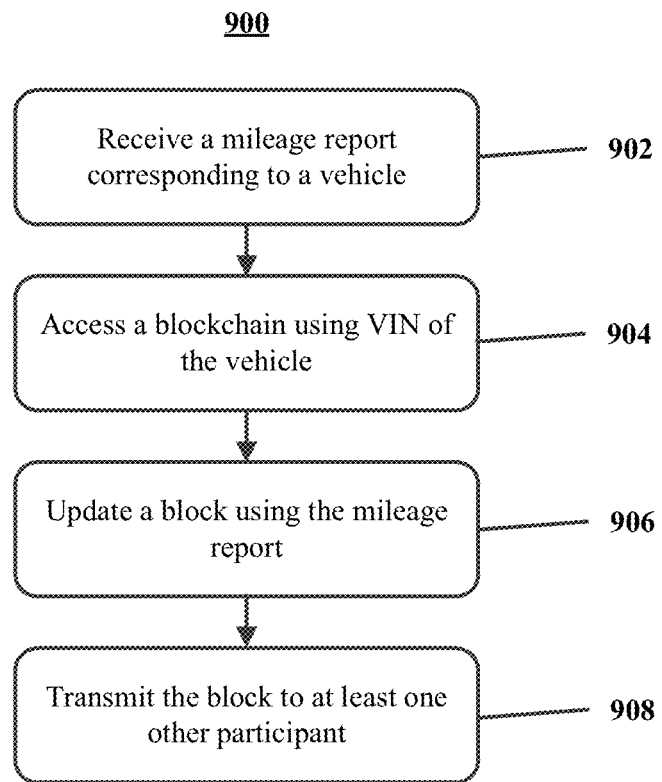
FIG. 9 depicts an exemplary flow diagram 900 in accordance with one aspect of the present disclosure.

FIG. 9 depicts an exemplary computer-implemented method 900 associated with one aspect of the present disclosure for ensuring transferability of title for a vehicle. The vehicle may correspond to a Vehicle Identification Number (VIN), or other unique vehicle identifier (including those discussed elsewhere herein), tracked by a blockchain that is maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the flow diagram 900 may be performed by the nodes in the network of participants, such as the nodes described in FIGS. 1A-4. The computer-implemented method 900 may include additional, fewer, or alternative actions, including those described elsewhere herein.

The computer-implemented method 900 may include receiving, at one or more processors (and/or transceivers) coupled with a network interface, a mileage report, the mileage report indicating an odometer reading for the vehicle and the VIN (or other unique vehicle identifier) corresponding to the vehicle (block 902). If the node is physically connected to the vehicle, receiving the mileage report may occur via a vehicle bus network over which various components, including an odometer, exchange data. If the node is separate from the vehicle, receiving the mileage report may occur via a wireless communication channel. In one embodiment, the mileage report may be received, at one or more processors (and/or transceivers) coupled with a network interface, after a threshold amount of time has elapsed since a prior mileage report for the vehicle was received (e.g., every 15 minutes, or other time period). Additionally or alternatively, the mileage report may be received contemporaneous to the vehicle being turned on (i.e., the mileage report is generated and transmitted when the vehicle turned on).

At block 904, the node may access, at a memory coupled to with the one or more processors, the blockchain using the VIN corresponding to the vehicle (or other unique vehicle identifier). To this end, the node may include an interface that enables the one or more processors to retrieve records associated with VINs (or other vehicle identifiers) tracked by the blockchain. According to some aspects, not every node is permitted to access and/or update the blockchain, or at least, update records associated with the VIN (or other vehicle identifier). Accordingly, accessing the blockchain using the VIN (or other vehicle identifier) may include (1) verifying, at the one or more processors, a notification source for the mileage report; (2) identifying, at the one or more processors, an entry in the blockchain corresponding to the VIN (or other vehicle identifier); and/or (3) accessing, at the memory, the entry in the blockchain corresponding to the VIN (or other vehicle identifier).

In one embodiment, to verify that the mileage report is received from the purported entity, verifying the notification source for the mileage report may include applying, by one or more processors, a public key associated with the vehicle to decrypt at least one of (i) the mileage report, or (ii) a digital signature included in the mileage report. To this end, the blockchain may be associated with a public key database that stores a public key for each vehicle (or VIN, or other vehicle identifier), node, and/or participant. Accordingly, upon receiving the mileage report, the node may query the public key database to retrieve the appropriate public key for the entity the mileage report purports to have transmitted the mileage report. If the retrieved public key successfully decrypts the mileage report and/or the digital signature, the notification source for the mileage report may be verified. On the other hand, if the public key does not decrypt the mileage report and/or the digital signature, the notification source for the mileage report may be unauthorized and the node may discard the mileage report.

At block 906, the node may update, at the memory, a block stored at the memory to associate the VIN (or other vehicle identifier) record for the vehicle with the odometer reading. In one embodiment, the update may include generating a blockchain transaction and/or event that indicates the VIN (or other vehicle identifier), the odometer reading, and/or a time.

At block 908, the node may transmit, via the one or more processors (and/or transceivers) coupled with the network interface (such as via wireless communication or data transmission over one or more radio frequency links and/or digital communication channels), the block to at least one other participant. In one alternate embodiment, prior to transmitting the block, the node may generate, at the one or more processors, a solution to a cryptographic puzzle. In this alternate embodiment, the solution to the cryptographic puzzle may be transmitted to the at least one other participant along with the block.

As described above, some jurisdictions may require that an odometer reading and/or other documentation is required to properly transfer title of a vehicle between entities. Accordingly, the method 900 may also include receiving, at one or more processors (and/or associated transceivers) coupled with a network interface (such as via wireless communication or data transmission over one or more radio links or digital communication channels), a title transfer request. The title transfer request may indicate that a title for the vehicle is being transferred to a new entity.

The method 900 may also include identifying, at the one or more processors, an entry in the blockchain corresponding to the VIN (or other vehicle identifier) and/or accessing, at the memory, the entry in the blockchain corresponding to the VIN (or other vehicle identifier) to retrieve an odometer reading for the vehicle. Additionally, accessing the entry in the blockchain corresponding to the VIN (or other vehicle identifier) may also be done to retrieve any other documents required to transfer title of the vehicle.

In these embodiments, similar to verifying the source of the mileage report, the node may verify, at the one or more processors, a notification source for the title transfer request. The verification may be performed by applying a public key associated with the vehicle (and/or an entity associated with the title transfer) to decrypt at least one of the title transfer request or a digital signature included in the title transfer request. Accordingly, the node may ignore the title transfer request if the node is unable to successfully decrypt the title transfer request, and/or the digital signature, using the retrieved public key.

Exemplary Computer-Implemented Method for OEM Recall Compliance

Figure 10:
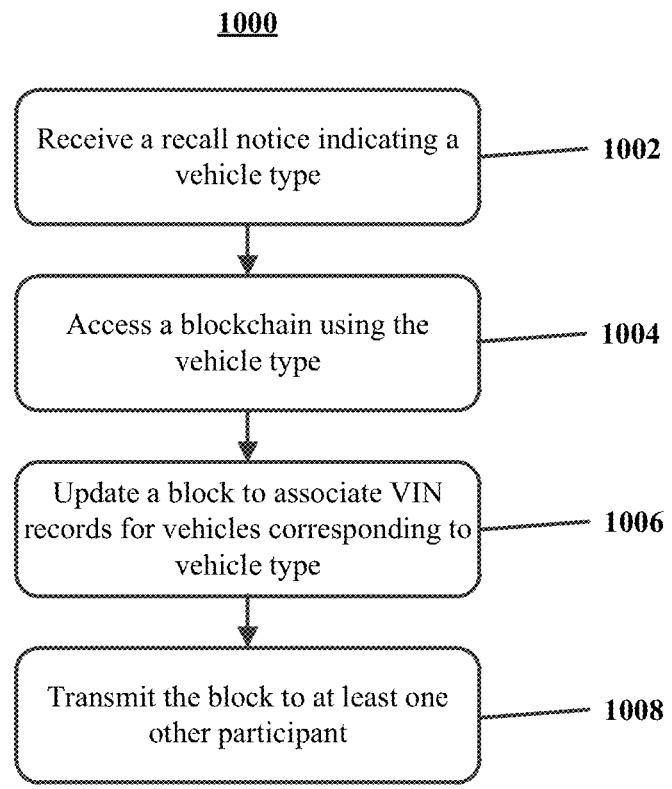
FIG. 10 depicts an exemplary flow diagram 1000 associated with one aspect of the present disclosure.

FIG. 10 depicts an exemplary computer-implemented method 1000 associated with one aspect of the present disclosure for tracking compliance with an OEM recall for a plurality of vehicles. The plurality of vehicles may correspond to a respective Vehicle Identification Number (VIN), or other vehicle identifier (including those discussed elsewhere herein), tracked by a blockchain that is maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the flow diagram 1000 may be performed by the nodes in the network of participants, such as the nodes described in FIGS. 1A-4. The computer-implemented method 1000 may include additional, fewer, or alternative actions, including those described elsewhere herein.

The computer-implemented method 1000 may include receiving, at one or more processors (and/or associated transceivers) coupled with a network interface (such as via wireless communication or data transmission over one or more radio frequency links or digital communication channels), a recall notice from a first participant, the recall notice indicating that a vehicle type has been recalled, the vehicle type indicating a make, a model, and a year (block 1002). The recall notice may additionally include an indication of a date of the recall. In one embodiment, the participant may be associated with the OEM conducting the recall. In another embodiment, the participant may be associated with a governmental entity tasked with regulating recalls (e.g. the National Highway Traffic Safety Administration).

At block 1004, the node may access, at a memory coupled with the one or more processors, the blockchain using the vehicle type to retrieve a VIN (or other vehicle identifier) record for vehicles in the plurality of vehicles that match the vehicle type indicated by the recall notice. According to some aspects, accessing the blockchain may include verifying, at the one or more processors, a notification source for the recall notice; identifying, at the one or more processors, one or more entries in the blockchain corresponding to the VIN (or other vehicle identifier) records for the vehicles matching the vehicle type; and/or accessing, at the memory, the one or more entries in the blockchain corresponding to the VIN (or other vehicle identifier) records for the vehicles matching the vehicle type.

According to certain aspects, not every node may be permitted to access and/or update the blockchain via a recall notice. Accordingly, verifying the notification source for the recall notice may include applying, by the one or more processors, a public key associated with the first participant to decrypt at least one of the recall notice and/or a digital signature included in the recall notice. As described herein, the blockchain may be associated with a public key database that stores a public key for each vehicle (or VIN or other vehicle identifier), node, and/or participant. Accordingly, upon receiving the recall notice, the node may query the public key database to retrieve the appropriate public key for the participant that transmitted the recall notice. If the retrieved public key successfully decrypts the recall notice and/or the digital signature, the notification source for the recall notice may be verified. On the other hand, if the public key does not decrypt the recall notice and/or the digital signature, the notification source for the recall notice may be unauthorized and the node may discard the recall notice.

At block 1006, the node may update, at the memory, a block stored at the memory to associate the VIN (or other vehicle identifier) record for the vehicles matching the vehicle type with the recall notice. To this end, the node may generate and record a transaction and/or an event indicative of the recall notice for each VIN (or other vehicle identifier) record corresponding to a vehicle that matches the recalled vehicle type.

At block 1008, the node may transmit, via the one or more processors (and/or associated transceivers) coupled with the network interface (such as via wireless communication or data transmission over one or more radio frequency links or digital communication channels), the block to at least one other participant. In one alternate embodiment, prior to transmitting the block, the node may generate, at the one or more processors, a solution to a cryptographic puzzle. In this alternate embodiment, the solution to the cryptographic puzzle may be transmitted to the at least one other participant along with the block.

Further, the method 1000 may include receiving, at the one or more processors (and/or associated transceivers) coupled with a network interface (such as via wireless communication or data transmission over one or more radio links or digital communication channels), a repair notification from a second participant. The repair notification may indicate that a particular vehicle of the plurality of vehicles has been repaired in compliance with the recall notice. According to some aspects, the second participant may be associated with the particular vehicle that has been repaired. Additionally or alternatively, the node may identify, at the one or more processors, an entry in the blockchain corresponding to the VIN (or other vehicle identifier) record for the particular vehicle and/or update, at the memory, the entry in the blockchain corresponding to the VIN (or other vehicle identifier) record for the particular to indicate that the vehicle has been repaired in compliance with the recall notice.

Similar to the recall notice, the node may verify, at the one or more processors, a notification source for the repair notification. To this end, the node may apply a public key associated with the second participant to decrypt at least one of the repair notification and/or a digital signature included in the repair notification. Accordingly, the node may ignore the repair notification if the node is unable to successfully decrypt the repair notification and/or the digital signature using the retrieved public key associated with the second participant.

In some aspects, an OEM may be required to contact entities associated with recalled vehicles. Accordingly, as described elsewhere herein, the VIN (or other vehicle identifier) record may include one or more addresses of the owner of the vehicle, a lessee of the vehicle, a lienholder for the vehicle, etc. As such, accessing the blockchain may include accessing, at the memory coupled with the one or more processors, the blockchain using the vehicle type to retrieve the one or more addresses included in the VIN (or other vehicle identifier) record for vehicles in the plurality of vehicles that match the vehicle type. The node may then automatically cause, at the one or more processors, a recall letter to be mailed to any number of the one or more addresses.

Accordingly, the node may be able to track which vehicles matching the recalled vehicle type have (and have not) been repaired in compliance with the recall notice. For those that have not, the node may determine, by the one or more processors, that a threshold amount of time has elapsed since the date of the recall. Thus, the node may access, at the memory coupled with the one or more processors, the blockchain to generate a set of VIN records (or other vehicle identifier records) associated with the recall notice and not associated with a repair notification (i.e., the recalled vehicle has not been repaired). The node may then automatically cause, at the one or more processors, a follow-up recall letter to be mailed to the one or more addresses included in the set of VIN records (or other vehicle identifier records).

Exemplary Computer-Implemented Method for Feature-Based Insurance Rating

Figure 11:
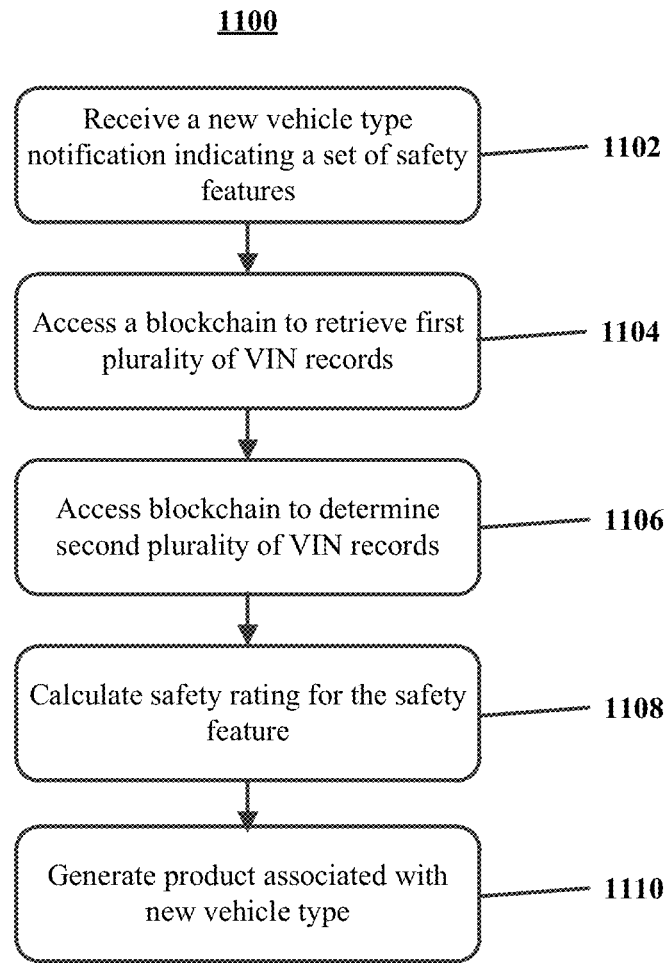
FIG. 11 depicts an exemplary flow diagram 1100 associated with one aspect of the present disclosure.

FIG. 11 depicts an exemplary computer-implemented method 1100 associated with one aspect of the present disclosure for safety feature-based rating for a vehicle utilizing a blockchain. The blockchain may be maintained by a plurality of participants, and include a plurality of Vehicle Identification Number (VIN) records (or other types of vehicle identifier records), respectively, corresponding to a plurality of vehicles. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the flow diagram 1100 may be performed by the nodes in the network of participants, such as the nodes described in FIGS. 1A-4. The computer-implemented method 1100 may include additional, fewer, or alternative actions, including those described elsewhere herein.

The computer-implemented method 1100 may include receiving, at one or more processors and/or associated transceivers coupled with a network interface (such as via wireless communication or data transmission over one or more radio links or digital communication channels), a new vehicle type notification from a first participant (block 1102). The new vehicle type notification may indicate a set of safety features associated with a new vehicle type. For example, the set of safety features may include automatic braking, autonomous highway mode, blind spot detection, and/or any other current and/or future-developed safety features. In one aspect, the safety features may be associated with a software developer, a software version, and/or a date the current software version was installed.

According to some aspects, not every node may be permitted to access and/or update the blockchain via a new vehicle type notification. Accordingly, the node may verify the notification source for the recall notice by applying, by the one or more processors, a public key associated with the first participant to decrypt at least one of the new vehicle type notification and/or a digital signature included in the new vehicle type notification. As described herein, the blockchain may be associated with a public key database that stores a public key for each vehicle (or VIN, or other vehicle identifier), node, and/or participant. Accordingly, upon receiving new vehicle type notification, the node may query the public key database to retrieve the appropriate public key for the participant that transmitted the new vehicle type notification.

If the retrieved public key successfully decrypts the new vehicle type notification and/or the digital signature, the notification source for the new vehicle type notification may be verified. On the other hand, if the public key does not decrypt the new vehicle type notification and/or the digital signature, the notification source for the recall notice may be unauthorized and the node may discard the new vehicle type notification.

At block 1104, the node may access, at a memory coupled with the one or more processors, the blockchain using the set of safety features to retrieve a first plurality of VIN records (or records associated with other types of vehicle identifiers) that indicate a safety feature within the set of safety features. In one embodiment, the node may access the blockchain using a software version of the safety feature to retrieve VIN records (or other vehicle identifier records) that indicate the software version of the safety feature within the set of safety features. According to some aspects, the VIN records (or other vehicle identifier records) may also include an indication of a distance traversed by the corresponding vehicle and/or a number of collisions experienced by the corresponding vehicle. Accordingly, the node may determine the distance traversed and/or the number of collisions experienced by each vehicle corresponding to a VIN record (or other vehicle identifier record) included in the first plurality of VIN records (or other vehicle identifier records).

At block 1106, the node may access, at the memory coupled with the one or more processors, the blockchain to retrieve a second plurality of VIN records (or other vehicle identifier records) corresponding to vehicles similar to vehicles corresponding to the first plurality of VIN records (or other vehicle identifier records, respectively), but lacking the safety feature within the set of safety features. Similar to the first plurality of VIN records (or other vehicle identifier records), the node may determine the distance traversed and/or the number of collisions experienced by each vehicle corresponding to a VIN record (or other vehicle identifier record) included in the second plurality of VIN records (or other vehicle identifier records). In some embodiments, the second plurality of VIN records (or other vehicle identifier records) may include vehicles corresponding to VIN records (or other vehicle identifier records) that indicate a prior software version for the safety feature included in the set of safety features.

At block 1108, the node may calculate, by the one or more processors, a safety rating for the safety feature by comparing VIN lifecycle data associated with VIN records (or other vehicle identifier records) within the first and second pluralities of VIN records (or other vehicle identifier records). In some embodiments, calculating the safety rating may include calculating a collision rate for the first and second pluralities of VIN records (or other vehicle identifier records) based upon the respective overall distances traversed and the numbers of collisions experienced. Based upon the relative collision rates, the node may be able to determine a metric that reflects the increased safety of the new safety features included in the set of safety features. In one example, if a node previously determined that the prior version of a particular safety feature has a safety rating of 0.8, and that the version of the safety feature included in the set of safety features has a 10% lower collision rate, the node may determine a safety rating of 0.72 for the new version of the safety feature.

According to some aspects, calculating the safety rating for the new vehicle type may include calculating, by the one or more processors, a safety rating for a plurality of safety features within the set of safety features by comparing VIN lifecycle data associated with VIN records (or other vehicle identifier records) within the first and second pluralities of VIN records (or other vehicle identifier records), and/or combining, by the one or more processors, the safety ratings for the plurality of safety features to generate a safety rating for the new vehicle type. In one embodiment, the node calculates an average safety rating based upon the safety rating for each safety feature in the set of safety features. In another embodiment, a supervised, unsupervised, or other machine learning algorithm, or other artificial intelligence program, is utilized to set weights for safety features in the set of safety features.

At block 1110, the node may generate, by the one more processors, a product associated with the new vehicle type based upon the generated safety rating for the safety feature. For example, the product may be an insurance product that insures vehicles of the new vehicle type. According to some aspects, the generated product may be based upon the generated safety rating for the new vehicle type. It should be appreciated the generated product may still require additional data to produce an offer. For example, the product may also be based upon characteristics associated with an owner of the vehicle. Accordingly, the product may include a model that receives the owner characteristics as an input to produce an offer for the product. It should be further appreciated that, as new data is recorded to VIN records (or other vehicle identifier records) maintained at the blockchain, the model may be adapted to reflect any shifts in safety ratings over time.

Additionally, the node may receive, at the one or more processors and/or associated transceivers coupled with the network interface (such as via wireless communication or data transmission over one or more radio links or digital communication channels), a product request notification from a second participant. The product request notification may indicate that an individual wants to purchase the generated product corresponding to the new vehicle type. According to some aspects, the product request notification may include a plurality of data associated with an owner for the vehicle of the new vehicle type. The node may input any owner data into the generated model to generate, at the one or more processors, an offer for the generated product. The node may then transmit, via the one or more processors and/or associated transceivers coupled with the network interface (such as via wireless communication or data transmission over one or more radio links or digital communication channels), the offer to the second participant.

According to certain aspects, similar to verifying the source of the new vehicle type notification, the node may verify, at the one or more processors, a notification source for the product request notification. The verification may be performed by applying a public key associated with the second participant to decrypt at least one of the product request notification or a digital signature included in the product request notification. Accordingly, the node may ignore the product request notification if the node is unable to successfully decrypt the product request notification and/or the digital signature using the retrieved public key.

Exemplary Computer-Implemented Method for Sensor Recalibration Detection

Figure 12:
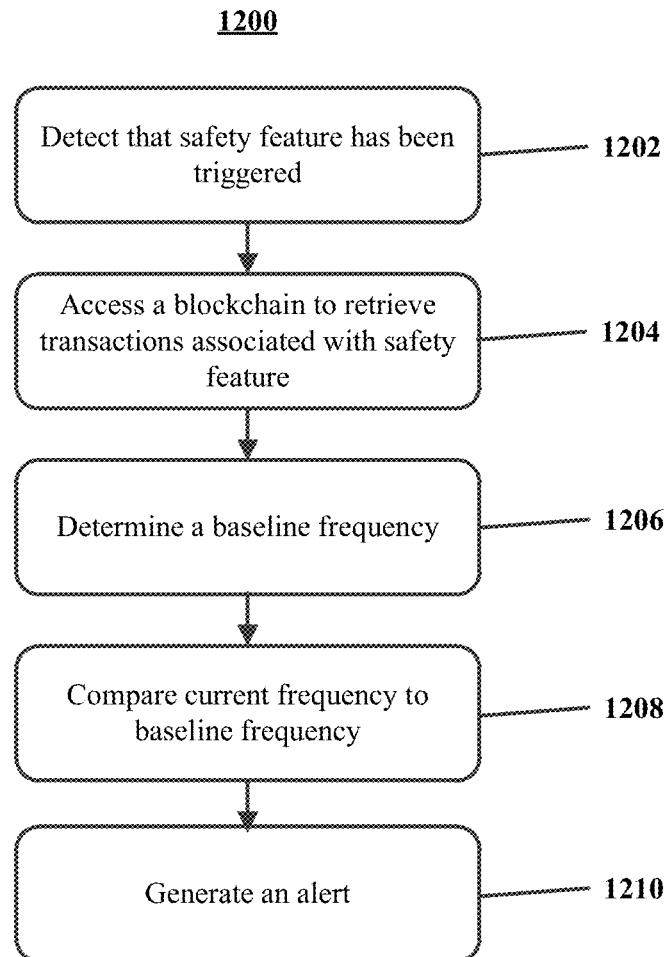
FIG. 12 depicts an exemplary flow diagram 1200 associated with one aspect of the present disclosure.

FIG. 12 depicts an exemplary computer-implemented method 1200 associated with one aspect of the present disclosure for utilizing a blockchain to detect that one or more sensors of a vehicle need to be recalibrated. The blockchain may be maintained by a plurality of participants and include a plurality of Vehicle Identification Number (VIN) records (or other vehicle identifier records) respectively corresponding to a plurality of vehicles. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the flow diagram 1200 may be performed by the nodes in the network of participants, such as the nodes described in FIGS. 1A-4. The computer-implemented method 1200 may include additional, fewer, or alternative actions, including those described elsewhere herein.

The computer-implemented method 1200 may include detecting, at one or more processors, that a safety feature of the vehicle has been triggered (block 1202). For example, the node may detect that a lane departure warning was triggered. In some embodiments, the node may detect the safety feature being triggered directly by detecting a message transmitted on a vehicle communication bus. In another embodiment, the node may remotely detect the safety feature being triggered by receiving a blockchain transaction via a wireless communication channel.

At block 1204, the node may access, at a memory coupled with the one or more processors, the blockchain using a VIN (or other type of vehicle identifier, including those discussed elsewhere herein) corresponding to the vehicle to retrieve one or more transactions indicative of the vehicle triggering the safety feature. To this end, the transactions may be associated with the VIN record (or other vehicle identifier record) for the VIN (or other vehicle identifier, respectively) corresponding to the vehicle. According to certain aspects, some safety features may be more likely to be triggered on particular types of channels (e.g., a highway, a country road, a city block, a shallow river, etc.). As such, in one embodiment, accessing the blockchain may include determining, by the one or more processors, a characteristic of a channel traversed by the vehicle; and/or retrieving, from the memory coupled with the one or more processors, the one or more transactions such that each transaction in the one or more transactions occurred while the vehicle was traversing a channel matching the characteristic of the channel traversed by the vehicle.

As described elsewhere herein, the blockchain may include VIN records (or other vehicle identifier records) of a plurality of vehicles. Thus, the VIN records (or other vehicle identifier records) associated with similar vehicles may be useful in determining whether the one or more sensors of the vehicle need to be recalibrated. Accordingly, accessing the blockchain may include determining, by the one or more processors, a set of VIN records (or other vehicle identifier records) included in the blockchain corresponding to vehicles having the same safety feature as the vehicle; and/or accessing, at the memory coupled with the one or more processors, the set of VIN records (or other vehicle identifier records) to retrieve one or more transactions indicative of the respective vehicle triggering the safety feature while the respective vehicle was traversing a channel matching the characteristic of the channel traversed by the vehicle.

Further, the safety feature may be associated with any number of software versions. In some scenarios, a software update may change the rate at which the safety feature is triggered. Accordingly, determining the set of VIN (or other vehicle identifier) records may include determining, by the one or more processors, a software version for the safety feature; and/or determining, by the one or more processors, the set of VIN (or other vehicle identifier) records included in the blockchain corresponding to vehicles having the same software version for safety feature as the vehicle.

At block 1206, based upon the one or more transactions, the node may determine, by the one or more processors, a baseline frequency at which the safety feature is expected to be triggered. According to certain aspects, determining the baseline frequency may include comparing, by the one or more processors, a distance traversed by the vehicle on channels matching the characteristic to a number of transaction that occurred while the vehicle was traversing channels matching the characteristic of the channel traversed by the vehicle. Similarly, determining the baseline frequency may also include comparing, by the one or more processors, a distance traversed by the vehicles corresponding to a VIN (or other vehicle identifier) record in the set of VIN (or other vehicle identifier) records on channels matching the characteristic to a number of transaction that occurred while the vehicles corresponding to a VIN (or other vehicle identifier) record in the set of VIN (or other vehicle identifier) records were traversing channels matching the characteristic of the channel traversed by the vehicle.

At block 1208, the node may compare, by the one or more processors, a current frequency at which the safety feature is being triggered to the baseline frequency. To this end, comparing the current frequency to the baseline frequency may include determining, by the one or more processors, that the current frequency is within a threshold variance from the baseline frequency. According to some aspects, determining the current frequency at which the safety feature is being triggered may include comparing, by the one or more processors, a distance traversed by the vehicle on the channel to a number of transaction that occurred while the vehicle was traversing the channel.

At block 1210, the node may generate, by the one more processors, an alert that indicates that one or more sensors associated with the safety feature should be recalibrated. For example, the alert may be a message transmitted to an electronic device associated with an owner of the vehicle (such as via wireless communication or data transmission over one or more radio links or digital communication channels) and/or may be a message presented via one or more interfaces associated with the vehicle. In some embodiments, generating the alert may include generating, by the one more processors, the alert responsive to determining that the current frequency is within the threshold variance from the baseline frequency.

According to certain aspects, in addition to a frequency that the safety feature was triggered, a lifetime metric may also be indicative of a likelihood that one or more sensors need to be recalibrated. The lifetime metric may be an indication of a distance traveled and/or a period of time since the one or more sensors were last calibrated. Accordingly, the method 1200 may also include determining, by the one or more processors, a lifetime metric indicative of when the one or more sensors were last calibrated.

In these embodiments, the node may determine, by the one or more processors, a set of VIN records (or other vehicle identifier records) included in the blockchain corresponding to vehicles having the same safety feature as the vehicle; and/or access, at the memory coupled with the one or more processors, the set of VIN records (or other vehicle identifier records) to determine an average lifetime metric for the safety feature. Additionally, in these embodiments, comparing the current frequency to the baseline frequency may include determining, by the one or more processors, that the lifetime metric is within a threshold variance from the average lifetime metric; and/or generating the alert may include generating, by the one more processors, the alert responsive to determining that the lifetime metric for the vehicle is within the threshold variance from the average lifetime metric.

Handling a Total Loss Vehicle

In one implementation, the systems and methods are directed to the handling of a total loss vehicle. A vehicle may be classified as a total loss vehicle, for example, if the vehicle has suffered damage that, if repaired, would cost more than the vehicle is worth. Determining whether a particular vehicle is a total loss vehicle may require knowing an estimated actual value of the vehicle such that it can be compared to the cost of the vehicle's needed repairs. In the case of a vehicle accident, it may be expensive and/or difficult to directly collect some pieces of information that have a bearing on the vehicle's estimated actual value.

A blockchain may provide an inexpensive, fast, and fraud-resistant way to obtain information relating to the actual value of a vehicle without the need to obtain information from other sources. A blockchain that tracks vehicles by VIN (or other vehicle identifier, such as those discussed elsewhere herein) and the state of those vehicles may store mileage reports based upon current odometer readings. The mileage of a vehicle may be included as a field in a transaction that identifies the vehicle by VIN (or other vehicle identifier).

Alternatively, or additionally, a block may be added to the blockchain with some or all of a "state snapshot" of the vehicle including mileage report information. The mileage report information may be added to the blockchain periodically, such as when the vehicle is visiting an automotive services provider who is authorized to update the vehicle's state on the block chain. In at least one implementation, the blockchain may be updated by the vehicle itself (e.g., periodically or in the case of a collision) or by another entity (e.g., as part of regular maintenance or in response to an insurance claim filed by the vehicle's owner).

Once a vehicle's mileage report is available on a blockchain that tracks a vehicle's VIN lifecycle, an entity seeking to estimate the actual cash value of the vehicle may obtain the needed data solely from the blockchain. A blockchain offers benefits in obtaining information needed to perform an actual cash value estimation for several reasons. Since the blockchain is immutable, for any information stored on the blockchain (e.g., a hash of the information is included in a block, the information itself is included as a transaction field in a block included in the chain, etc.), that information can be said to have existed on the date the information was introduced to the blockchain based upon verifiable cryptographic proof and confirmed by the aggregate validation efforts of all participating network nodes.

One major component in an actual value estimation of a vehicle is the vehicle's mileage. If a blockchain that tacks vehicle lifecycles based upon VIN (or other vehicle identifier) stores a mileage report of a vehicle, that information may be accessed by the entity performing the actual value estimation. If the mileage reports are made periodically, then the blockchain data sets a lower bound on what the current mileage of a given vehicle may be. If mileage reports are not periodically stored on the blockchain, then a third-party may make such a recordation at the request of the entity who wishes to perform the actual value estimation. Any mileage report may include a proof-of-identity of the entity making the report (e.g., the vehicle itself, an automotive service provider, etc.).

An actual value estimation may be performed based upon data in a blockchain that tracks vehicle lifecycles by VIN (or other vehicle identifier) based upon other information in addition to mileage. In one implementation, a vehicle manufacturer includes information regarding the vehicle, such as optional features that may increase the value of the vehicle (e.g., leather interior, engine type, color, sunroof, battery capacity, the vehicle's financing ratio, etc.). In another implementation, automotive service providers may include repairs or replacements on the vehicle in the blockchain (e.g., rebuilt engine, replaced components such as water pump, transmission, battery health measurement, electric motor, etc.). In yet another implementation, automotive service providers may include regular maintenance of the vehicle in a blockchain. These and any other aspects of a vehicle may recorded in a blockchain that tracks vehicles by VIN (or other vehicle identifier) and subsequently relied upon to perform an Actual Cash Value (ACV) estimation by any entity with access to the blockchain.

Once an ACV has been calculated for a vehicle, the ACV may be used to handle a total loss of the vehicle. A vehicle may be considered a total loss if the cost of needed repairs exceeds or approaches the value of the vehicle. If a vehicle is classified as a total loss, then an insurer may decline to pay the cost of repairs according to an insurance agreement covering the vehicle, and instead may opt to make a payment to the vehicle owner of an amount equal to the ACV. In at least some implementations, a total loss vehicle is subject to one or more financing agreements. The insurer may be obligated to pay off these one or more financing agreements before remitting the remainder of the ACV to a vehicle owner. In another implementation, classification of a vehicle as a total loss may include transferring the legal title, which may be an electronic title or e-title, of the vehicle to a third party such as a salvager.

Exemplary Method of Handling Total Loss Vehicle

Figure 13:
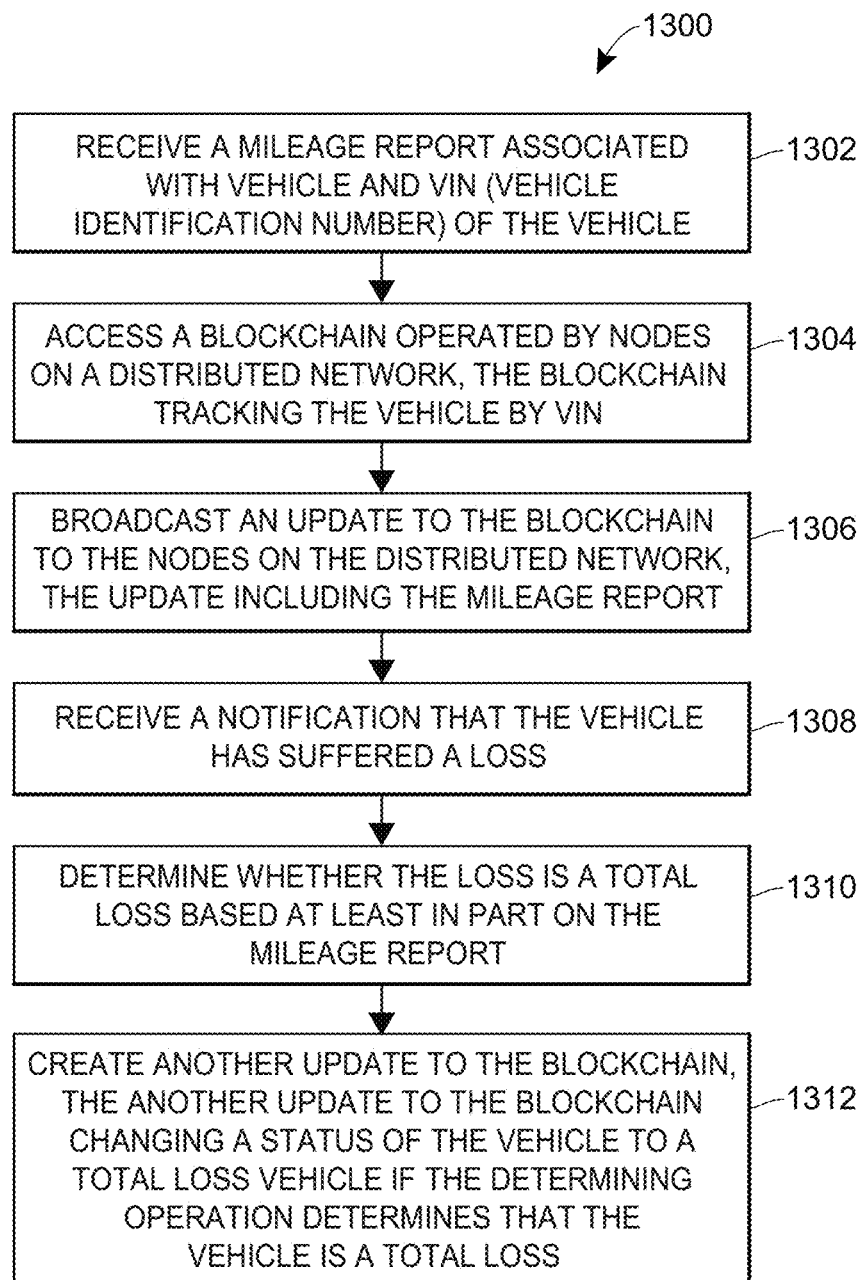
FIG. 13 depicts an exemplary computer-implemented method of utilizing blockchain technology to handle a total loss vehicle.

FIG. 13 depicts an exemplary computer-implemented method of utilizing blockchain technology to handle a total loss vehicle 1300. The method 1300 may include (1) receiving, via one or more processors and/or associated transceivers (such as via wireless communication or data transmission over one or more radio frequency links or digital communication channels), a mileage report or a current odometer reading associated with a vehicle, and the vehicle's Vehicle Identification Number VIN (or other vehicle identifier, including those discussed elsewhere herein) 1302; (2) identifying and accessing, via the one or more processors, a blockchain associated with the vehicle, the vehicle's blockchain may be identified and access using the vehicle's VIN (or other vehicle identifier) as a key 1304; (3) creating, via the one or more processors, a new block (to add to the blockchain) using or including the mileage report or current odometer reading, and/or otherwise updating the vehicle blockchain to reflect or indicate the current vehicle mileage 1306; (4) estimating, via the one or more processors, the Actual Cash Value (ACV) of the vehicle based upon, at least in part, the current vehicle mileage 1308; (5) receiving, via the one or more processors, vehicle sensor data indicative of a total loss event (e.g., the one or more processors may analyze the sensor data to determine that an abrupt change of G forces or deceleration exceeded a predetermined threshold, indicating a vehicle collision occurred) and/or otherwise receiving a notification that the vehicle is a total loss 1310; (6) identifying and retrieving, via the one or more processors and/or associated transceivers (such as via wireless communication or data transmission over one or more radio frequency links or communication channels), any outstanding vehicle loan or lien information, and determining a current payoff amount 1312; and/or (7) determining, via the one or more processors, a difference between the vehicle loan payoff amount and the ACV determined using the current vehicle mileage to facilitate handling total loss vehicles (which may include transferring total loss vehicle title from lien holders and/or vehicle owners to insurance and/or salvage companies) 1314. The method may include additional, less, or alternate actions, including those discussed elsewhere herein.

Vehicle Over-Financing and Under-Financing

In one implementation, a blockchain tracking vehicle lifecycles by VIN (or other vehicle identifier, including those discussed elsewhere herein) may be used to determine whether a vehicle is over-financed or under-financed. A blockchain that is updated with lifecycle information regarding a vehicle by VIN number (e.g., vehicle mileage, title status, repairs, etc.) provides a snapshot of the status of the vehicle at various points in time. An entity that is interested in searching a particular vehicle by VIN (or other vehicle identifier) may further request information be added to the blockchain in addition to historical information (e.g., requesting a new mileage report be added to the blockchain). In addition to the snapshots of the status of the vehicle, a vehicle manufacturer may initiate tracking of the vehicle at manufacture or shipping time, and may include information regarding the vehicle, the vehicle's OEM features, etc.

Taking all the changes regarding a vehicle reflected in the blockchain together, an entity may estimate an Actual Cash Value (ACV) of the vehicle. Information regarding a financing level of the vehicle may also be obtained from the blockchain tracking vehicles by VIN (or other vehicle identifier) or financing information may be obtained off-chain. In at least one implementation, a lender updates the blockchain at regular intervals to reflect a remaining loan balance, and whether the loan on a vehicle identified by a VIN (or other vehicle identifier) is in good standing.

With an estimated actual value and an outstanding loan value, the system may determine whether a vehicle identified by a VIN (or other vehicle identifier) is over-financed or under-financed. That is, if the vehicle has an actual cash value that is less than a finance value, then the vehicle is over-financed (e.g., underwater). If the vehicle identified by the VIN (or other vehicle identifier) has an actual cash value that is greater than a financed value, then the vehicle is under-financed, meaning the owner of the vehicle has at least some equity.

Whether a vehicle is over-financed or under-financed may have a bearing on several operations regarding the vehicle, such as whether a payment is due to a vehicle owner in the event of a total loss, whether a vehicle refinancing loan offer should be made to the owner of the vehicle and for how much, etc. Information related to vehicle over or under financing may be stored on the blockchain.

Exemplary Method of Determining Whether Vehicle is Over or Under Financed

Figure 14:
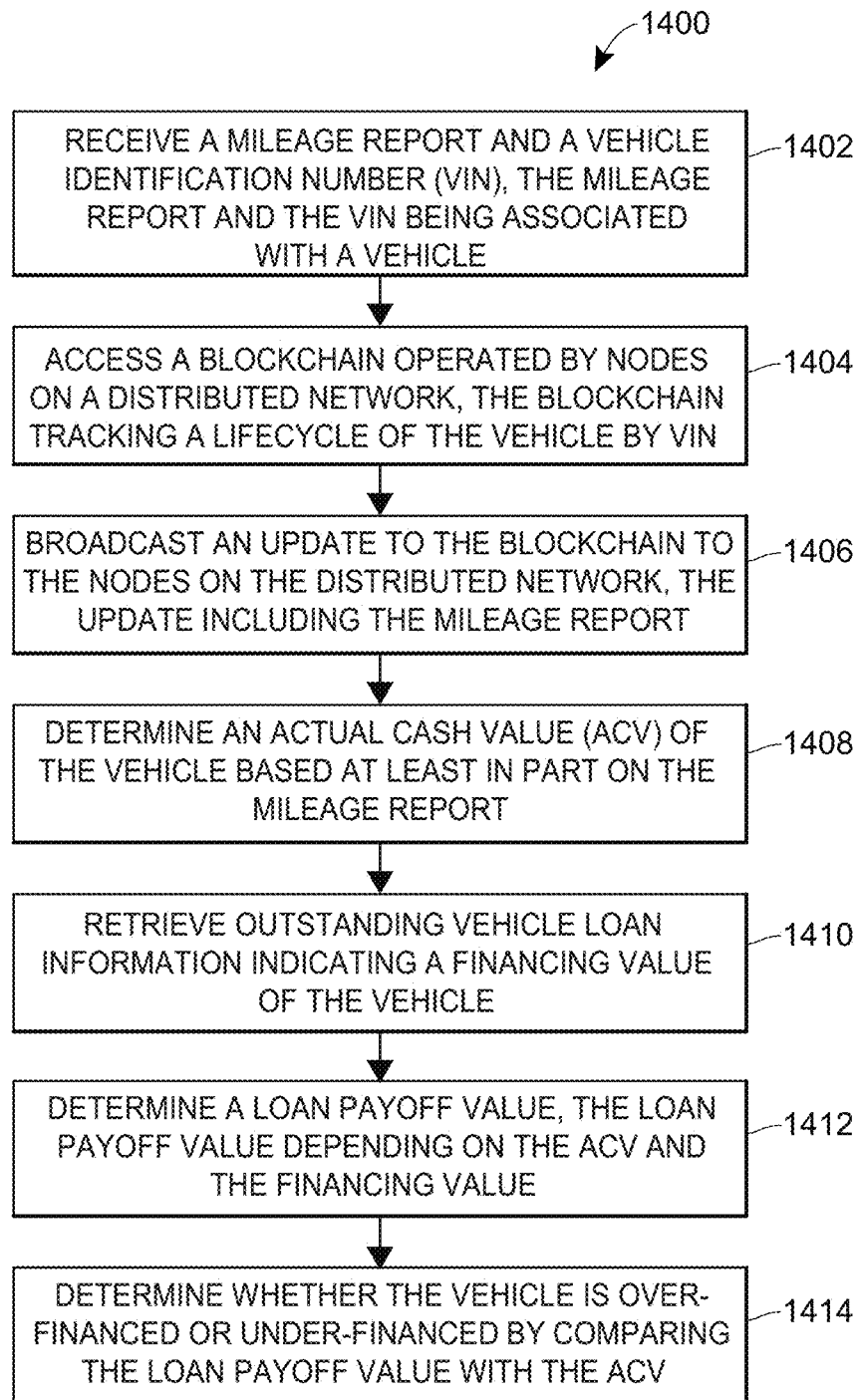
FIG. 14 depicts an exemplary computer-implemented method of utilizing blockchain technology to determine whether a vehicle is over or under financed.

FIG. 14 depicts an exemplary computer-implemented method of utilizing blockchain technology to determine whether a vehicle is over or under financed 1400. The method 1400 may include (1) receiving, via one or more processors and/or associated transceivers (such as via wireless communication or data transmission over one or more radio frequency links or digital communication channels), a mileage report or a current odometer reading associate with a vehicle, and the vehicle's VIN (Vehicle Identification Number), or other vehicle identifier 1402; (2) identifying and accessing, via the one or more processors, a blockchain associated with the vehicle, the vehicle's blockchain may be identified and access using the vehicle's VIN, or other vehicle identifier, as a key 1404; (3) creating, via the one or more processors, a new block (to add to the blockchain) using or including the mileage report or current odometer reading, and/or otherwise updating the vehicle blockchain to reflect or indicate the current vehicle mileage 1406; (4) estimating, via the one or more processors, the Actual Cash Value (ACV) of the vehicle based upon, at least in part, the current vehicle mileage 1408; (5) identifying and retrieving, via the one or more processors and/or associated transceivers (such as via wireless communication or data transmission over one or more radio frequency links or communication channels), any outstanding vehicle loan or lien information, and determining a current payoff amount 1410; (6) determining, via the one or more processors, whether the vehicle is over or under financed by comparing current loan payoff amount with ACV of the vehicle 1412; and/or (7) using, via the one or more processors, the amount of over or under financing to handle a total loss vehicle payment to the vehicle owner or lienholder, and/or otherwise to resolve an associated insurance claim for the total loss vehicle 1414. Additionally or alternatively, if the vehicle has not been involved in a vehicle collision, the method may include (8) generating, via the one or more processors, a refinancing loan, and offering vehicle refinancing based upon the amount that the vehicle is over or under financed 1416. The method may include additional, less, or alternate actions, including those discussed elsewhere herein.

Providing Usage-Based Insurance (UBI)

One type of insurance coverage is a Usage-Based Insurance (UBI) model wherein a policy holder pays a premium based upon the policy holder's exposure to liability in contrast to paying a flat fee for any amount of activity that could potentially lead to liability. An example of UBI is vehicle insurance where the premium is based at least in part on the number of miles driven or pay-by-mile insurance, and/or the type of miles driven (e.g., city, highway, rural roads, night driving, etc.). Some forms of UBI have been difficult to administer because information regarding the policy holder's activities is needed that may be difficult to accurately and inexpensively obtain. Self-reporting may be fraught with fraud risk because policy holders are likely to under-report to minimize their premium costs. Vehicle telematics may be problematic to the extent they would include information about the policy holder that the policy holder would wish to keep private (e.g., when and where the policy holder drives the vehicle).

A blockchain that tracks vehicle lifecycle by VIN number (or other vehicle identifier) may be used to overcome obstacles to administering UBI. A vehicle may include a hardware or software component to manage and generate sets of private/public cryptographic key pairs that may be used to broadcast transactions to a blockchain network to update a state of the vehicle at various points in time. Third parties, such as automotive repair service providers, may also use cryptographic keys to broadcast transactions to the blockchain network to record aspects of the vehicle that have a bearing on UBI (e.g., a current mileage or daily vehicle miles or vehicle usage). Automotive service providers may be likely to truthfully report the characteristics of the vehicle to the blockchain because any transaction they broadcast creates an immutable record of their report, which, if proven false, would be associated with their identity (e.g., public cryptographic address) for as long as the blockchain persists.

In one implementation, a UBI quote is provided for a vehicle based upon the mileage driven by the vehicle (or other forms of vehicle usage, such as insurance based upon time, such as days or weeks). A blockchain that tracks vehicle lifecycle by VIN (or other vehicle identifier) may include updates to a state of a particular vehicle including updates to the vehicle's current mileage (e.g., mileage reports or odometer readings). An insurance provider may access the blockchain and search for all blocks and/or transactions that revise a current mileage of the vehicle. Revisions to a current mileage of the vehicle may include proofs-of-identity of the entity making such mileage revisions (e.g., a trusted automotive services provider, the vehicle autonomously, a government inspector or registrar, etc.). The insurance provider may disregard any vehicle mileage revisions for the vehicle that were not made by a trusted entity (e.g., the vehicle owner).

Taking all vehicle mileage reports in the blockchain together, an insurance provider may reconstruct a model of how far the vehicle tends to be driven. The insurance provider may therefore propose a UBI quote for the vehicle based upon an expected number of miles driven. Additionally, the insurance provider may broadcast a transaction to the blockchain network to indicate that such an insurance offer for the vehicle has been made and/or accepted by the vehicle owner. Such a transaction may be cryptographically signed by the insurance provider to provide an assurance to parties inspecting the blockchain that there is a valid insurance policy in place for the vehicle (e.g., government registrar, entity contracting to use the vehicle, any person involved with the vehicle who may suffer a loss related thereto, etc.). An insurance provider may include information relating to the insurance such as the coverage levels and/or type of coverage in the blockchain for inspection by any entity with access to the shared ledger. In one implementation, vehicles on the blockchain are identified by VIN (or another identifier), and an insurance transaction broadcast by an insurer identifies the vehicle by VIN (or other vehicle identifier) such that the information may be located by any entity using the VIN (or other vehicle identifier) as a search parameter on the blockchain.

In another implementation, an insurance provider may have agreed to insure a vehicle on an UBI model wherein the vehicle owner pays on a per mile basis (or alternatively on a per day, week, or month basis). For the per mile basis, the insurer may search a blockchain tracking vehicle lifecycle by VIN (or other vehicle identifier, including those discussed elsewhere herein) to assess the actual mileage driven by the vehicle over a period of time. In one implementation, a premium may be paid to an insurer for a base mileage, and an additional premium may be due to the insurer for any mileage over the base mileage. The additional premium may be paid on a per mile basis, a block of miles basis, etc. An insurer may search the blockchain tracking vehicles by VIN (or other vehicle identifier) to determine an estimated actual mileage of a vehicle based upon mileage reports stored thereon. The estimated actual mileage of the vehicle may be compared to a mileage paid for my premiums to determine a mileage overage or underage of the vehicle.

Mileage reports may include more than just a mileage number of the vehicle. Mileage reports may also include additional information such as average vehicle speed, times of day that the vehicle was most likely to be operated, locations the vehicle was driven, etc. These additional pieces of information in the vehicle mileage reports permit a more customized insurance quote to account for usage patterns that are more or less likely to lead to liability (e.g., drivers who operate a vehicle late at night are more likely to incur a vehicle loss, highway driving may be more likely to incur a larger loss than city driving, drivers who regularly exceed the speed limit are more likely to incur a loss, etc.).

Once a mileage overage or underage has been calculated, the insurer may create and transmit an additional insurance quote to the vehicle (e.g., the vehicle's owner, a vehicle control system, etc.) offering to remediate the mileage overage/underage (e.g., offering to extend the base mileage amount for an additional premium payment, a notice that the vehicle is no longer insured, a premium credit based upon mileage underage, etc.). In one implementation, an insurer may offer to extend UBI coverage for an additional premium, and the offer may be accepted by the vehicle owner. The insurer may then broadcast a transaction to the blockchain network to reflect the revised insurance coverage for the vehicle. In another implementation, the vehicle owner does not accept an offer to extend UBI coverage for an additional premium payment, and the insurer may broadcast a transaction to the blockchain network to update the blockchain to reflect that the insurer no longer insures the vehicle, or that another insurer currently insures the vehicle.

Exemplary Computer-Implemented Method of Providing UBI

Figure 15:
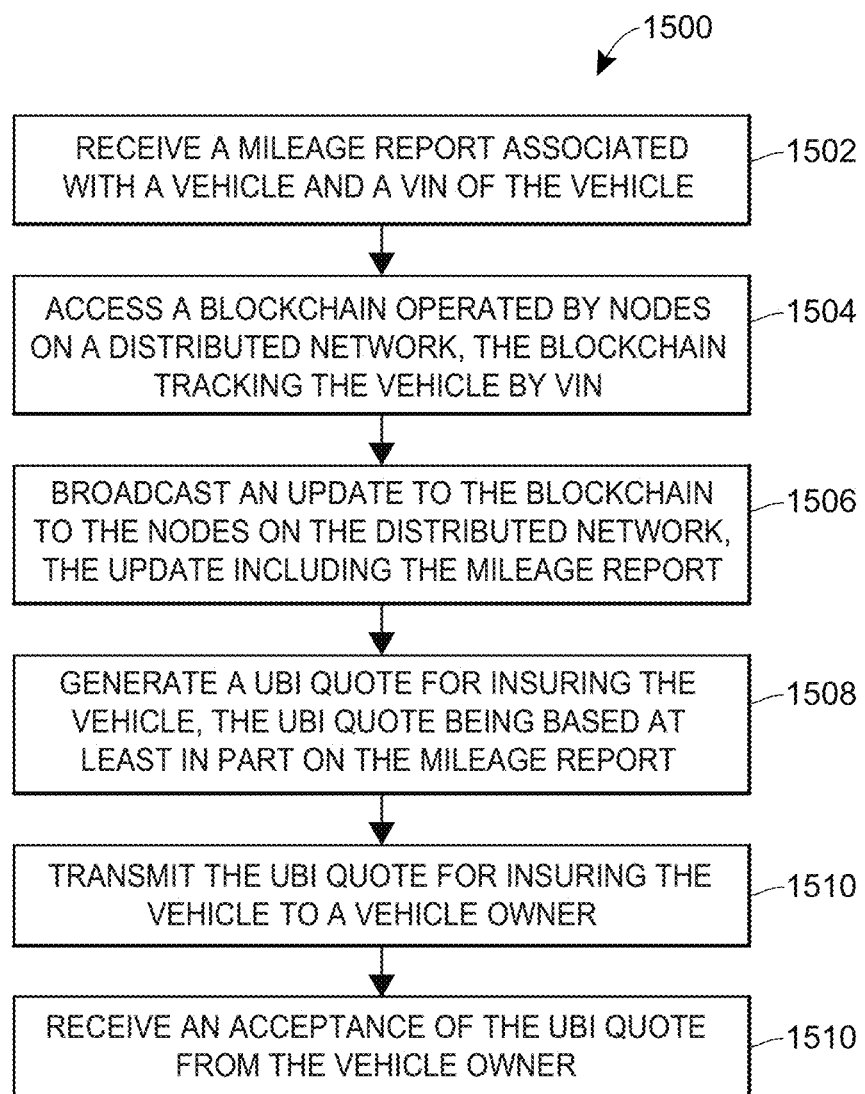
FIG. 15 depicts an exemplary computer-implemented method of utilizing blockchain technology to generate a UBI (Usage-Based Insurance) quote.

FIG. 15 depicts an exemplary computer-implemented method of utilizing blockchain technology to generate a UBI (Usage-Based Insurance) quote 1500. The method 1500 may include (1) receiving, via one or more processors and/or associated transceivers (such as via wireless communication or data transmission over one or more radio frequency links or digital communication channels), a mileage report or a current odometer reading associate with a vehicle, and the vehicle's VIN (Vehicle Identification Number), or another vehicle identifier 1502; (2) identifying and accessing, via the one or more processors, a blockchain associated with the vehicle, the blockchain associated with the vehicle may be identified and access using the vehicle's VIN, or other vehicle identifier, as a key 1504; (3) creating, via the one or more processors, a new block (to add to the blockchain) using or including the mileage report or current odometer reading, and/or a transaction otherwise updating the vehicle blockchain to reflect or indicate the current vehicle mileage 1506; (4) generating, via the one or more processors, an auto insurance quote or a UBI (Usage-Based Insurance) quote (such as pay-by-mile or pay-by-time) based upon, at least in part, the current vehicle mileage 1508; (5) transmitting, via the one or more processors and/or associated transceivers (such as via wireless communication or data transmission over one or more radio frequency links or communication channels), the insurance or UBI quote to the vehicle, or to a mobile device of the vehicle owner, for owner or driver review and approval, and/or to an autonomous vehicle with a vehicle controller configured to ensure that the vehicle maintains insurance coverage while driving autonomously and constantly adding miles driven); and/or (6) creating, via the one or more processors, a new block or otherwise updating the blockchain if the insurance or UBI quote is accepted by the vehicle owner or driver, or the autonomous vehicle. The method may include additional, less, or alternate actions, including those discussed elsewhere herein.

Figure 16:
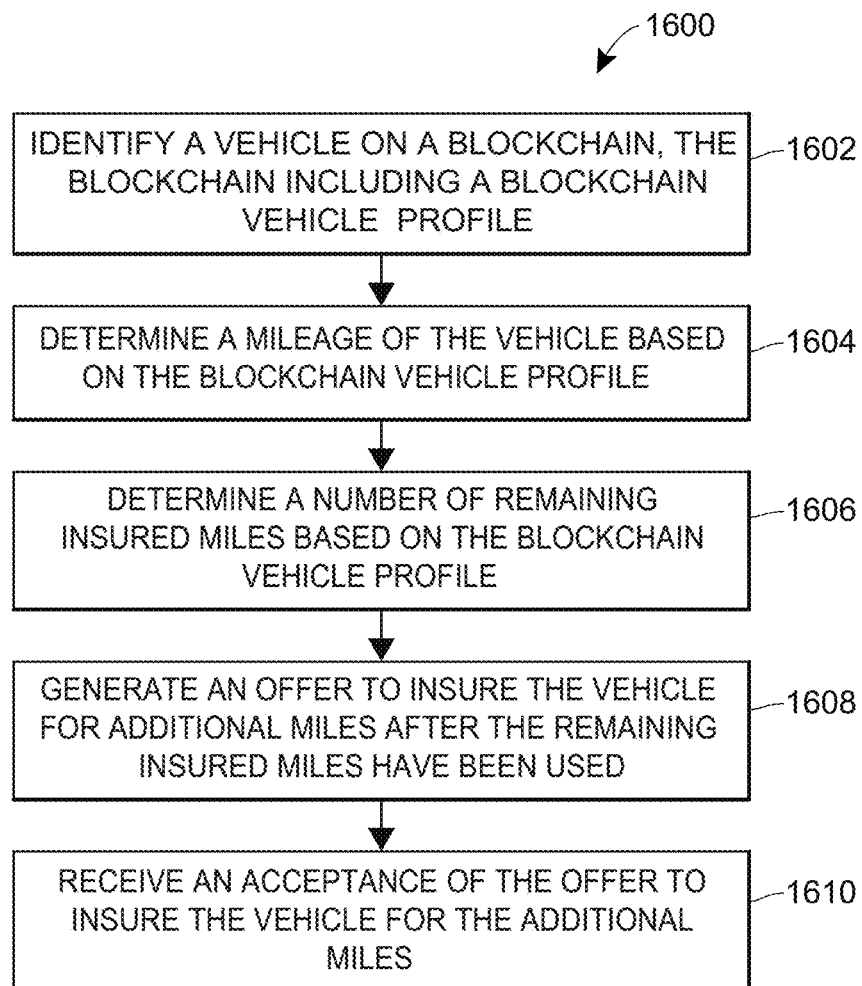
FIG. 16 depicts an exemplary computer-implemented method of utilizing blockchain technology to provide UBI (Usage-Based Insurance)

FIG. 16 depicts an exemplary computer-implemented method of utilizing blockchain technology to provide UBI (Usage-Based Insurance) 1600. The method 1600 may include (1) receiving, via one or more processors and/or associated transceivers (such as via wireless communication or data transmission over one or more radio frequency links or digital communication channels), a mileage report or a current odometer reading associate with a vehicle, and the vehicle's VIN (Vehicle Identification Number), or another vehicle identifier 1602; (2) identifying and accessing, via the one or more processors, a blockchain associated with the vehicle, the vehicle's blockchain may be identified and access using the vehicle's VIN, or other vehicle identifier, as a key 1604; (3) creating, via the one or more processors, a new block (to add to the blockchain) using or including the mileage report or current odometer reading, and/or otherwise updating the vehicle blockchain to reflect or indicate the current vehicle mileage 1606; (4) comparing, via the one or more processors, the current mileage with paid for miles of UBI contract to determine mileage usage, overage, and/or underage 1608; (5) generating and transmitting, via the one or more processors and/or associated transceivers (such as via wireless communication or data transmission over one or more radio frequency links or communication channels), a new UBI contract that reflects the present mileage overage or underage (e.g., adds more pay-be-mile insurance coverage when the vehicle is approaching the limit on previously paid for miles) 1610; and/or (6) if the new UBI contract or additional pay-by-miles are approved, creating, via the one or more processors, a new block or otherwise updating the blockchain to reflect the updated UBI contract 1612. The method may include additional, less, or alternate actions, including those discussed elsewhere herein.

Estimating Actual Cash Value (ACV)

In one implementation, the systems and method disclosed herein may be directed to estimating an Actual Cash Value (ACV) of a vehicle. A blockchain may provide an inexpensive, fast, and fraud-resistant way to obtain information bearing on the actual value of a vehicle without the need to obtain information from other sources that would likely be less reliable and more expensive. A blockchain that tracks vehicles by VIN (or other vehicle identifier) and the state of those vehicles over time can store information bearing on the value of the vehicle. For example, a vehicle manufacturer may include an initial transaction on the blockchain to establish a VIN (or other vehicle identifier) as being assigned to a particular vehicle. This initial transaction may contain other information relating to the vehicle, such as OEM features, engine type, battery capacity, additional features, point of origin, date of manufacture, port of shipment, color, autonomous vehicle systems or technologies, semi-autonomous vehicle systems or technologies, and any other relating to the vehicle.

Over the lifecycle of the vehicle, more transactions may be broadcast to the blockchain network to update a state of the vehicle. For example, a blockchain that tracks vehicles by VIN (or other vehicle identifier) and the state of those vehicles can store mileage reports based upon current odometer readings. The mileage of a vehicle may be included as a field in a transaction that identified the vehicle by VIN (or other vehicle identifier). Alternatively, or additionally, a block may be added to the blockchain with some or all of a "state snapshot" of the vehicle including mileage report information. The mileage report information may be added to the blockchain periodically, such as when the vehicle is visiting an automotive services provider who is authorized to update the vehicle's state on the block chain, when legal title of the vehicle changes hands, etc. In at least one implementation, the blockchain may be updated by the vehicle itself (e.g., periodically or in the case of a collision or other event) or by another entity (e.g., as part of regular maintenance or in response to an insurance claim filed by the vehicle's owner).

Once a vehicle's mileage report is available on a blockchain that tracks a vehicle's VIN lifecycle, an entity seeking to estimate the Actual Cash Value (ACV) of the vehicle may obtain the needed data solely from the blockchain. A blockchain may offer benefits in obtaining information needed to perform an actual cash value estimation for several reasons. Since the blockchain is immutable, for any information stored on the blockchain (e.g., a hash of the information is included in a block, the information itself is included as a transaction field in a block included in the chain, etc.), that information can be said to have existed on the date the information was introduced to the blockchain based upon verifiable cryptographic proof and confirmed by the aggregate validation efforts of all participating network nodes.

One major component in an actual value estimation of a vehicle is the vehicle's mileage. If a blockchain that tacks vehicle lifecycles based upon VIN (or other vehicle identifier) stores a mileage report of a vehicle, that information may be accessed by the entity performing the actual value estimation. If the mileage reports are made periodically, then the blockchain data sets a lower bound on what the current mileage of a given vehicle may be. If mileage reports are not periodically stored on the blockchain, then a third-party may make such a recordation at the request of the entity who wishes to perform the actual value estimation. Any mileage report may include a proof-of-identity of the entity making the report (e.g., the vehicle itself, an automotive service provider, etc.).

An actual value estimation may be performed based upon data in a blockchain that tracks vehicle lifecycles by VIN (or other vehicle identifier) based upon other information in addition to mileage. In one implementation, a vehicle manufacturer includes information regarding the vehicle, such as optional features that may increase the value of the vehicle (e.g., leather interior, engine type, color, sunroof, battery capacity, the vehicle's financing ratio, various types of sensors, autonomous or semi-autonomous features or functionality, etc.). In another implementation, automotive service providers may include repairs or replacements on the vehicle in the blockchain (e.g., rebuilt engine, replaced components such as water pump, transmission, battery health measurement, electric motor, etc.). In yet another implementation, automotive service providers may include regular maintenance of the vehicle in a blockchain. These and any other aspects of a vehicle may recorded in a blockchain that tracks vehicles by VIN (or other vehicle identifier) and subsequently relied upon to perform an actual cash value estimation by any entity with access to the blockchain.

Exemplary Method of Estimating Acv

Figure 17:
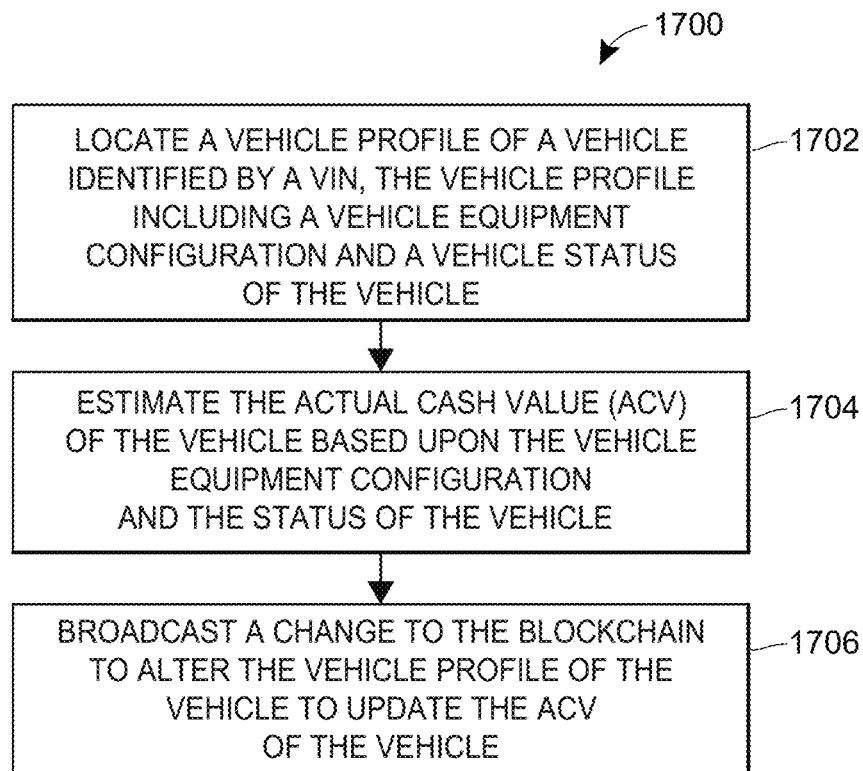
FIG. 17 depicts an exemplary computer-implemented method of utilizing blockchain technology to estimate vehicle Actual Case Value (ACV) based upon actual vehicle build.

FIG. 17 depicts an exemplary computer-implemented method of utilizing blockchain technology to estimate vehicle Actual Cash Value (ACV) based upon actual vehicle build 1700. The method 1700 may include (1) receiving, via one or more processors and/or associated transceivers (such as via wireless communication or data transmission over one or more radio frequency links or digital communication channels), a vehicle build information, including vehicle add-ons, variable and/or optional features, make/model data, various vehicle-mount sensor data (either directly or indirectly from each sensor), and/or autonomous/semi-autonomous system or technology features or data 1702, along with a VIN (Vehicle Identification Number), or other vehicle identifier, including those discussed elsewhere herein; (2) creating, via the one or more processors, a blockchain associated with the vehicle, the vehicle's blockchain may be identified and access using the vehicle's VIN, or other vehicle identifier, as a key 1704; (3) creating, via the one or more processors, a new block (to add to the blockchain) using or including the vehicle build information and/or vehicle sensor/autonomous system data, and/or otherwise updating the vehicle blockchain to reflect or indicate the current vehicle build 1706; (4) estimating, via the one or more processors, the actual cash value (ACV) of the vehicle based upon, at least in part, the current vehicle build 1708; (5) creating, via the one or more processors, a new block using the vehicle build information and/or ACV estimated, or otherwise updating the vehicle blockchain with the ACV 1710; and/or (6) transmitting, via the one or more processors and/or associated transceivers (such as via wireless communication or data transmission over one or more radio frequency links or communication channels), the blockchain with vehicle build information and the ACV estimate to other nodes in a communications network, such as vehicle dealership, repair shop, bank, DMV, and/or insurance provider nodes. The method may include additional, less, or alternate actions, including those discussed elsewhere herein.

Handling Vehicles Post-Collision

When a vehicle has been involved in a collision, there are often several steps that should take place in coordination among many parties, including the vehicle owner, other parties to the collision, one or more insurance providers, providers of vehicle repair services, medical services, temporary transportation services, legal services, and more. The interests of these parties may often not be aligned and they may be subject to contractual obligations to other of the parties involved. Communications among the parties may often be accompanied by documentary evidence (e.g., police report, forensics report, medical diagnosis, vehicle repair diagnosis, etc.).

A blockchain that tracks vehicle lifecycles by VIN (or other vehicle identifier) may be a tool to consolidate the communications, information, and documentary support needed to resolve insurance claims in the wake of a vehicle collision. Vehicles on the blockchain may be uniquely identified by VIN (or other unique vehicle identifier), and changes to the configuration and/or state of the vehicles may be made by broadcasting transactions and/or blocks to participants in the blockchain network that will be added to the shared ledger if the transactions and/or blocks satisfy the consensus rules applied by the blockchain network.

When a vehicle has been involved in a collision, the vehicle may autonomously report telematics data and an indication that the vehicle has been involved in a collision to a recipient (e.g., a manufacturer, an insurer, a service provider, vehicle owner, bank, etc.). The recipient of the telematics data may broadcast a transaction to the blockchain network to store the telematics data in a way that is associated with the vehicle. In one implementation, the blockchain is organized by VIN (or other vehicle identifier) such that telematics data may be associated with the VIN (or other vehicle identifier) of the vehicle that was involved in the collision.

In at least one implementation, the blockchain may serve as a timestamp and documentary validator when a hash of the telematics data is associated with the vehicle on the blockchain shortly after the collision. The actual documentary evidence may later be made available to other parties with interests in or obligations arising from the collision, which then may be validated by comparing a hash of the provided data to the hash stored on the blockchain after the collision. If the hash values match, then the blockchain provides cryptographic proof of the validity of the documentary evidence.

Post-collision inspection of a vehicle may be performed by various parties such as automotive repair services providers to determine a repair diagnosis and estimated cost. A party completing an inspection of a vehicle may broadcast a transaction to the blockchain network to associate the results of the inspection with the VIN (or other vehicle identifier) including the repair estimate. The broadcaster may include a cryptographic proof-of-identity to verify the authenticity of the repair diagnosis. Other parties involved in the collision may view the repair estimate and broadcast transactions of their own if they dispute the repair estimate to mark the estimate as contested. Other transactions may be broadcast to indicate no objection or agreement to a repair estimate. Other types of inspections that may be broadcast to the blockchain include medical diagnosis, cost of replacement, etc.

Forensic data may be collected from the scene of a collision to determine the identity of parties at fault. The forensic data may be collected by a police force or government agency tasked with investigating vehicle crashes. The entity collecting forensic data may broadcast a transaction to the blockchain to indicate the results of the forensic study. In one implementation, forensic data stored on the blockchain includes the VIN (or other vehicle identifier) of any vehicles involved in the collision.

In at least one implementation, a smart contract executes on the blockchain to manage the various aspects of the claim resolution process. For example, a contract owner may instantiate a new contract upon receipt of a collision report involving vehicles identified by VIN (or other vehicle identifier). Insurers may be required to post a bond to be held by the contract until the claims process has been resolved. In at least one implementation, the bond is paid into the contract with a token having monetary value circulating on the blockchain. In return for posting the bond, the insurers may receive a special token allowing them to vote or express a position on aspects of the claim resolution process.

After all documentary evidence has been posted to the blockchain regarding the collision, a party may propose a resolution to the claim, such as by a submission to the contract owner. If the other parties accept the proposal, the bonds may be released to the insurers, parties may be paid for services rendered or to be rendered, and parties whose loss is covered may be reimbursed. Payments may be made on the blockchain in the form of a token circulating thereon or they may occur off-chain and the payment recorded on the blockchain. After the parties have accepted the proposal, the contract may be marked as resolved as a record of the claim resolution.

Exemplary Method of Handling Vehicles Post-Collision

Figure 18:
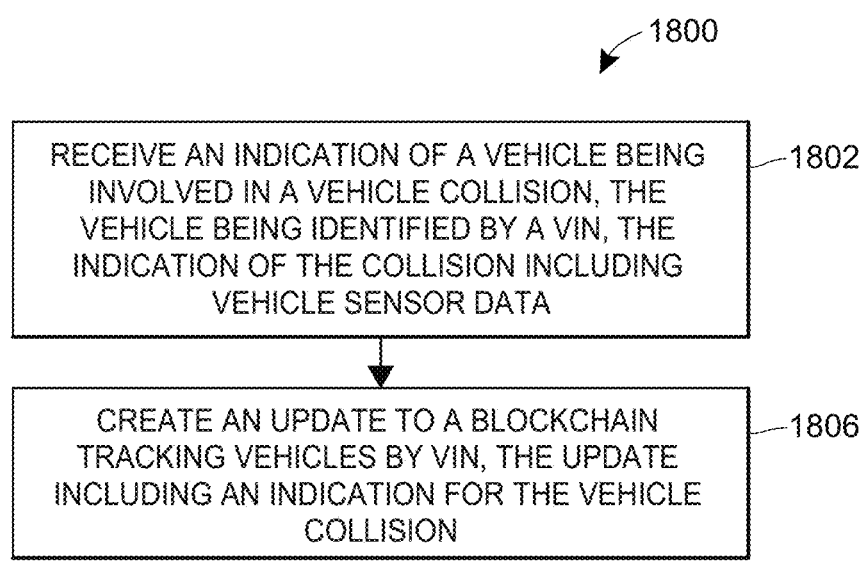
FIGS. 18 and 19 depict exemplary computer-implemented methods of utilizing blockchain technology to handle vehicles after vehicle collisions based upon vehicle sensor data.

FIG. 18 depicts an exemplary computer-implemented method of utilizing blockchain technology to route vehicles after vehicle collisions based upon vehicle sensor data 1800. The method 1800 may include (1) receiving, via one or more processors and/or associated transceivers (such as via wireless communication or data transmission over one or more radio links), an indication of vehicle being involved a vehicle collision and vehicle VIN (or other vehicle identifier) 1802; (2) retrieving, via the one or more processors and/or associated transceivers, a vehicle blockchain associated with the vehicle using the VIN (or other vehicle identifier) as a key to accessing the vehicle blockchain 1804; (3) receiving, via the one or more processors and/or associated transceivers, vehicle sensor data (generated by vehicle-mounted sensors mounted on the vehicle, such as sensors associated with autonomous or semi-autonomous systems or features) generated or collected prior to, during, and/or after the vehicle collision 1806; (4) creating, via the one or more processors, a block that includes the vehicle sensor data (to add to the vehicle blockchain), or otherwise updating the vehicle blockchain with the vehicle sensor data associated with the vehicle collision 1808; (5) analyzing, via the one or more processors, the vehicle sensor data to reconstruct the vehicle collision, and determine (i) a cause of the vehicle collision (or assign fault, or lack thereof, for the vehicle collision to one or more vehicle operators or autonomous vehicles), (ii) a likely or estimated complexity of repair, (iii) one or more qualified repair shops, and/or (iv) faulty and working vehicle-mounted sensors, and/or estimate a repair cost 1810; and/or (6) updating, via the one or more processors, the blockchain (or create a new block) to include and/or indicate the foregoing information, and transmitting, via the one or more processors and/or associated transceivers, the updated blockchain (or new block) to other nodes in a communication network (such as repair shop, bank, and insurance provider nodes) 1812. The method may include additional, less, or alternate actions, including those discussed elsewhere herein.

Figure 19:
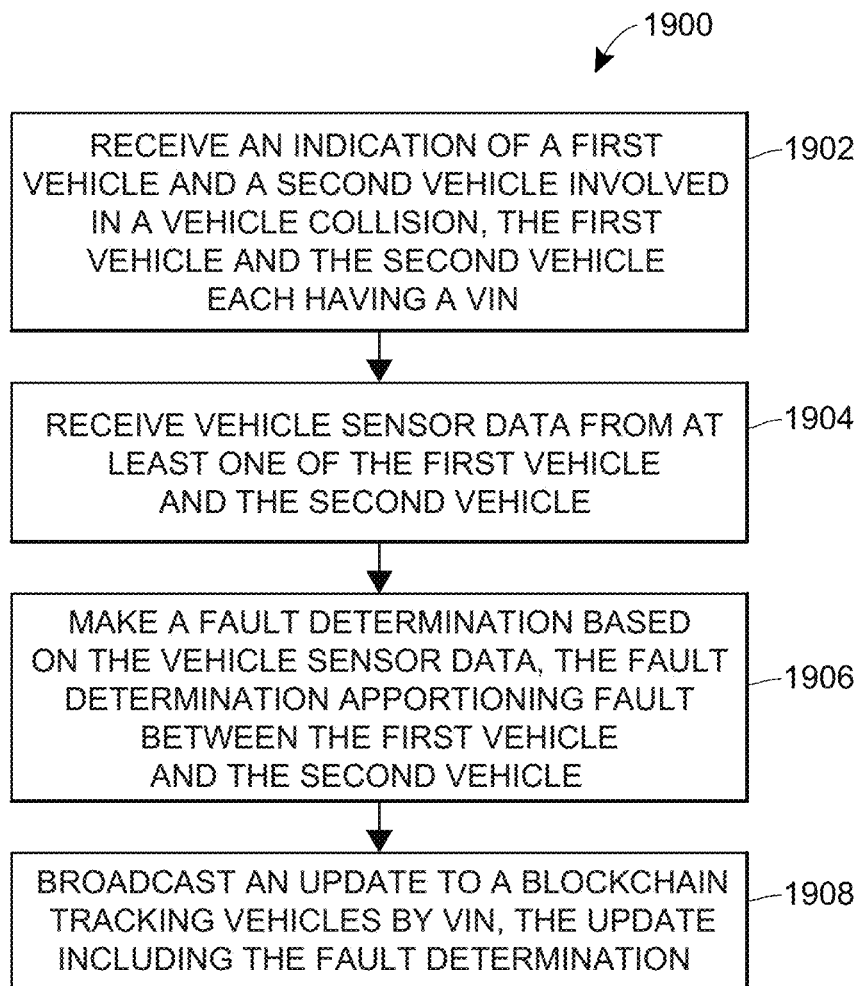

FIG. 19 depicts an exemplary computer-implemented method of utilizing blockchain technology to route vehicles after vehicle collisions based upon vehicle sensor data 1800. The method 1900 may include (1) receiving, via one or more processors and/or associated transceivers (such as via wireless communication or data transmission over one or more radio links), an indication of 2 vehicles being involved a vehicle collision and both vehicle VINs (or other vehicle identifiers) 1902; (2) receiving, via the one or more processors and/or associated transceivers, vehicle sensor data (generated by vehicle-mounted sensors mounted on both vehicles, such as sensors associated with autonomous or semi-autonomous features or systems) generated or collected prior to, during, and/or after the vehicle collision 1904; (3) creating, via the one or more processors, a block or blockchain that includes the vehicle sensor data from both vehicles, an indication that both vehicles have been involved in a vehicle collision, and both vehicle's VIN (or other vehicle identifier) 1906; (4) analyzing, via the one or more processors, the vehicle sensor data from both vehicles to reconstruct the vehicle collision, and determine (i) a cause of the vehicle collision (or assign fault, or lack thereof, for the vehicle collision to one or more vehicle operators or autonomous vehicles), (ii) a likely or estimated complexity of repair for each vehicle, (iii) one or more qualified repair shops, and/or (iv) faulty and working vehicle-mounted sensors mounted on each vehicle, and/or estimate a repair cost for each vehicle 1908; and/or (5) updating, via the one or more processors, the blockchain (or create a new block) to include and/or indicate the foregoing information, and transmitting, via the one or more processors and/or associated transceivers, the updated blockchain (or new block) to other nodes in a communication network (such as repair shop, bank, and insurance provider nodes) 1910. The method may include additional, less, or alternate actions, including those discussed elsewhere herein.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

Further to this point, although the embodiments described herein often utilize credit report information as an example of sensitive information, the embodiments described herein are not limited to such examples. Instead, the embodiments described herein may be implemented in any suitable environment in which it is desirable to identify and control specific type of information. As part of implementing the automotive claims process, vehicle loss history, and/or the lifecycle of a Vehicle Identification Number, a financial institution may be a part of the process. For example, the aforementioned embodiments may be implemented by the financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

With the foregoing, a user may be an insurance customer who may opt-in to a rewards, insurance discount, or other type of program. After the insurance customer provides their affirmative consent, an insurance provider remote server may collect data from the customer's mobile device, smart vehicle, autonomous vehicle, smart home controller, or other smart devices—such as with the customer's permission or affirmative consent. The data collected may be related to vehicle and/or autonomous vehicle functionality, and/or insured assets, such as vehicles, before (and/or after) an insurance-related event, including those events discussed elsewhere herein. In return, risk averse insureds, such as vehicle owners or operators, may receive discounts or insurance cost savings related to auto and other types of insurance from the insurance provider.

In one aspect, sensor data, such as vehicle or mobile device sensor data, and/or other data, including the types of data discussed elsewhere herein, may be collected or received by an insurance provider remote server, such as via direct or indirect wireless communication or data transmission from a smart vehicle, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, and/or (ii) vehicle occupants.

As noted herein, after collection of the information regarding the vehicle by one or more nodes within a communication network, a transaction (and/or new block) including the vehicle information collected may be broadcast to the blockchain, and/or a new block verified and then added to the blockchain to reflect an updated state of the vehicle. For each of the computer-implemented methods discussed herein, in one embodiment, a transaction and/or new block may be generated and then broadcast to the blockchain network for verification once vehicle data, and/or new sensor or other data, have been generated and/or collected by one or more nodes within the communication network. As such, tracking the status of a vehicle may be more reliable and/or fraud-resistant as each node may include a proof-of-identity in its transaction modifying the state of the vehicle and/or vehicle-related blocks or blockchain.

Further, with the computer-implemented methods discussed herein, network participants may function as full nodes that validate and/or generate new blocks and transactions, and/or compile transactions into blocks that are then added to the network. However, not all participants need be nodes that compile transactions into blocks, and/or validate transactions and blocks received from other network participants—as some network participants may wish to rely on other network nodes to provide computer processing and/or storage services that enable usage of the system or blockchain.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In some embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for safety feature-based rating for a vehicle utilizing a blockchain, the blockchain being maintained by a plurality of participants and including a plurality of Vehicle Identification Number (VIN) records respectively corresponding to a plurality of vehicles, the method comprising:
   receiving, at one or more hardware processors coupled with a network interface, a new vehicle type notification from a first participant, the new vehicle type notification indicating a set of safety features associated with a new vehicle type of the vehicle;
   accessing, at a memory coupled with the one or more hardware processors, the blockchain being maintained by the plurality of participants using the set of safety features indicated in the received notification to retrieve a first plurality of VIN records respectively corresponding to the plurality of vehicles that indicate a safety feature within the set of safety features;
   accessing, at the memory coupled with the one or more hardware processors, the blockchain to retrieve a second plurality of VIN records corresponding to vehicles comparable to vehicles corresponding to the first plurality of VIN records, but lacking the indicated safety feature within the set of safety features;
   calculating, by the one or more hardware processors, a safety rating for the indicated safety feature by comparing VIN lifecycle data associated with VIN records within the first and second pluralities of VIN records; and
   generating, by the one more hardware processors, a product associated with the new vehicle type based upon the generated safety rating for the indicated safety feature such that the generated product can be requested by a second participant of the plurality of participants.

2. The computer-implemented method of claim 1, wherein calculating the safety rating comprises:
   accessing, at the memory coupled with the one or more hardware processors, the VIN records within the first and second plurality of VIN records to determine an overall distance traversed by vehicles corresponding to the VIN records within the first and second pluralities of VIN records;
   accessing, at the memory coupled with the one or more hardware processors, the VIN records within the first and second plurality of VIN records to determine a number of collisions experienced by vehicles corresponding to the VIN records within the first and second pluralities of VIN records; and calculating, by the one or more processors, a collision rate for the first and second pluralities of VIN records based upon the respective overall distances traversed and the numbers of collisions experienced.

3. The computer-implemented method of claim 1, further comprising:

calculating, by the one or more hardware processors, a safety rating for a plurality of safety features within the set of safety features by comparing VIN lifecycle data associated with VIN records within the first and second pluralities of VIN records; and combining, by the one or more hardware processors, the safety ratings for the plurality of safety features to generate a safety rating for the new vehicle type.

4. The computer-implemented method of claim 3, wherein generating the product associated with the new vehicle type comprises:

generating, by the one or more hardware processors, the product associated with the new vehicle type based upon the generated safety rating for the new vehicle type.

5. The computer-implemented method of claim 1, further comprising:

verifying, by the one or more hardware processors, a notification source for the new vehicle type notification by applying a public key associated with the first participant to decrypt at least one of (i) the new vehicle type notification or (ii) a digital signature included in the new vehicle type notification.

6. The computer-implemented method of claim 1, further comprising:

receiving, at the one or more hardware processors coupled with the network interface, a product request notification from a second participant, the product request notification indicating the new vehicle type;

generating, at the one or more hardware processors, an offer for the generated product; and transmitting, via the one or more hardware processors coupled with the network interface, the offer to the second participant.

7. The computer-implemented method of claim 6, further comprising:

verifying, by the one or more hardware processors, a notification source for the product request notification by applying a public key associated with the first participant to decrypt at least one of (i) the product request notification or (ii) a digital signature included in the product request notification.

8. The computer-implemented method of claim 1, wherein accessing the blockchain using the set of safety features comprises:

accessing, at the memory coupled with the one or more hardware processors, the blockchain using a software version for a safety feature within the set of safety features.

9. The computer-implemented method of claim 8, wherein accessing the blockchain to retrieve a second plurality of VIN records comprises:

accessing, at the memory couple with the one or more hardware processors, the blockchain to retrieve the second plurality of VIN records corresponding to vehicles having a prior software version for the indicated safety feature than the safety feature included in the set of safety features.

10. A system for safety feature-based rating for a vehicle utilizing a blockchain, the blockchain being maintained by a plurality of participants and including a plurality of Vehicle Identification Number (VIN) records respectively corresponding to a plurality of vehicles, the system comprising:

a network interface configured to interface with one or more hardware processors;

a memory configured to store non-transitory computer executable instructions and configured to interface with the one or more hardware processors; and the one or more hardware processors configured to interface with the memory, wherein the one or more hardware processors are configured to execute the non-transitory computer executable instructions to cause the system to:

receive a new vehicle type notification from a first participant, the new vehicle type notification indicating a set of safety features associated with a new vehicle type of the vehicle;

access the blockchain being maintained by the plurality of participants using the set of safety features indicated in the received notification to retrieve a first plurality of VIN records respectively corresponding to the plurality of vehicles that indicate a safety feature within the set of safety features;

access the blockchain to retrieve a second plurality of VIN records corresponding to vehicles comparable to vehicles corresponding to the first plurality of VIN records, but lacking the indicated safety feature within the set of safety features;

calculate a safety rating for the indicated safety feature by comparing VIN lifecycle data associated with VIN records within the first and second pluralities of VIN records; and generate a product associated with the new vehicle type based upon the generated safety rating for the indicated safety feature such that the generated product can be requested by a second participant of the plurality of participants.

11. The system of claim 10, wherein to calculate the safety rating, the instructions, when executed, cause the system to:

access the VIN records within the first and second plurality of VIN records to determine an overall distance traversed by vehicles corresponding to the VIN records within the first and second pluralities of VIN records;

access the VIN records within the first and second plurality of VIN records to determine a number of collisions experienced by vehicles corresponding to the VIN records within the first and second pluralities of VIN records; and calculate a collision rate for the first and second pluralities of VIN records based upon the respective overall distances traversed and the numbers of collisions experienced.

12. The system of claim 10, wherein the instructions, when executed, cause the system to:

calculate a safety rating for a plurality of safety features within the set of safety features by comparing VIN lifecycle data associated with VIN records within the first and second pluralities of VIN records; and combine the safety ratings for the plurality of safety features to generate a safety rating for the new vehicle type.

13. The system of claim 12, wherein to generate the product associated with the new vehicle type, the instructions, when executed, cause the system to:

generate the product associated with the new vehicle type based upon the generated safety rating for the new vehicle type.

14. The system of claim 10, wherein the instructions, when executed, cause the system to:
verify a notification source for the new vehicle type notification by applying a public key associated with the first participant to decrypt at least one of (i) the new vehicle type notification or (ii) a digital signature included in the new vehicle type notification.

15. The system of claim 10, wherein the instructions, when executed, cause the system to:
receive a product request notification from a second participant, the product request notification indicating the new vehicle type;
generate an offer for the generated product; and
transmit the offer to the second participant.

16. The system of claim 15, wherein the instructions, when executed, cause the system to:
verify a notification source for the product request notification by applying a public key associated with the first participant to decrypt at least one of (i) the product request notification or (ii) a digital signature included in the product request notification.

17. The system of claim 10, wherein to access the blockchain using the set of safety features, the instructions, when executed, cause the system to:
access the blockchain using a software version for a safety feature within the set of safety features.

18. The system of claim 17, wherein to access the blockchain to retrieve a second plurality of VIN records, the instructions, when executed, cause the system to:
access the blockchain to retrieve the second plurality of VIN records corresponding to vehicles having a prior software version for the indicated safety feature than the safety feature included in the set of safety features.

19. A non-transitory computer-readable storage medium storing instructions executable by a hardware processor, that when executed cause one or more hardware processors to:

receive a new vehicle type notification from a first participant, the new vehicle type notification indicating a set of safety features associated with a new vehicle type;
access a blockchain being maintained by plurality of participants using the set of safety features indicated in the received notification to retrieve a first plurality of Vehicle Identification Number (VIN) records that indicate a safety feature within the set of safety features;
access the blockchain to retrieve a second plurality of VIN records corresponding to vehicles comparable to vehicles corresponding to the first plurality of VIN records, but lacking the indicated safety feature within the set of safety features;
calculate a safety rating for the indicated safety feature by comparing VIN lifecycle data associated with VIN records within the first and second pluralities of VIN records; and
generate a product associated with the new vehicle type based upon the generated safety rating for the indicated safety feature such that the generated product can be requested by a second participant of the plurality of participants.

20. The computer-readable storage medium of claim 19, wherein to calculate the safety rating, the instructions, when executed, cause the one or more hardware processors to:
access the VIN records within the first and second plurality of VIN records to determine an overall distance traversed by vehicles corresponding to the VIN records within the first and second pluralities of VIN records;
access the VIN records within the first and second plurality of VIN records to determine a number of collisions experienced by vehicles corresponding to the VIN records within the first and second pluralities of VIN records; and
calculate a collision rate for the first and second pluralities of VIN records based upon the respective overall distances traversed and the numbers of collisions experienced.

* * * * *